US007347192B2

(12) United States Patent
Perry et al.

(10) Patent No.: US 7,347,192 B2
(45) Date of Patent: Mar. 25, 2008

(54) LOW POWER CONSUMPTION LATCH CIRCUIT INCLUDING A TIME DELAY FOR A FUEL VAPOR PRESSURE MANAGEMENT APPARATUS

(75) Inventors: Paul D. Perry, Chatham (CA); Andre Veinotte, Dresden (CA)

(73) Assignee: Continential Automotive Systems US, Inc., Auburn Hills ( * ) Notice: Subject to any disclaimer, the term of this patent is extended or adjusted under 35 U.S.C. 154(b) by 406 days.

(21) Appl. No.: 11/228,960

(22) Filed: Sep. 16, 2005

(65) Prior Publication Data
US 2006/0076063 A1   Apr. 13, 2006

Related U.S. Application Data

(60) Provisional application No. 60/611,023, filed on Sep. 17, 2004, provisional application No. 60/610,989, filed on Sep. 17, 2004.

(51) Int. Cl.
*F02M 33/02* (2006.01)
*F02M 33/04* (2006.01)
(52) U.S. Cl. ...................... 123/518; 123/519
(58) Field of Classification Search ............... 123/518, 123/519, 520, 516, 198 D; 60/283, 285
See application file for complete search history.

(56) References Cited

U.S. PATENT DOCUMENTS

| 4,903,672 | A | * | 2/1990 | MacKinnon | 123/520 |
|---|---|---|---|---|---|
| 5,067,469 | A | * | 11/1991 | Hamburg | 123/520 |
| 5,220,898 | A | | 6/1993 | Kidokoro et al. | |
| 5,359,978 | A | * | 11/1994 | Kidokoro et al. | 123/520 |
| 5,441,031 | A | * | 8/1995 | Kiyomiya et al. | 123/518 |
| 5,943,997 | A | | 8/1999 | Kinsey et al. | |
| 6,516,786 | B2 | | 2/2003 | Krimmer et al. | |
| 6,755,185 | B2 | * | 6/2004 | Esteghlal et al. | 123/520 |

FOREIGN PATENT DOCUMENTS

EP    0818621 A1    1/1998

* cited by examiner

*Primary Examiner*—Mahmoud Gimie

(57) ABSTRACT

A fuel vapor pressure management apparatus for an internal combustion engine includes a housing, a pressure operable device, and a printed circuit board. The pressure operable device moves between first and second configurations with respect to the housing. The printed circuit board is supported by the housing and includes a delay and a sensor. The delay commences upon internal combustion engine shutdown and concludes after a preset period. And the sensor indicates movement of the pressure operable device in the first configuration after the conclusion of the preset period.

19 Claims, 23 Drawing Sheets

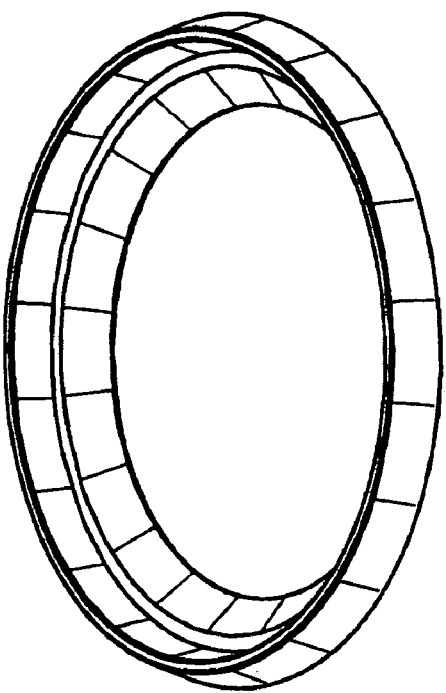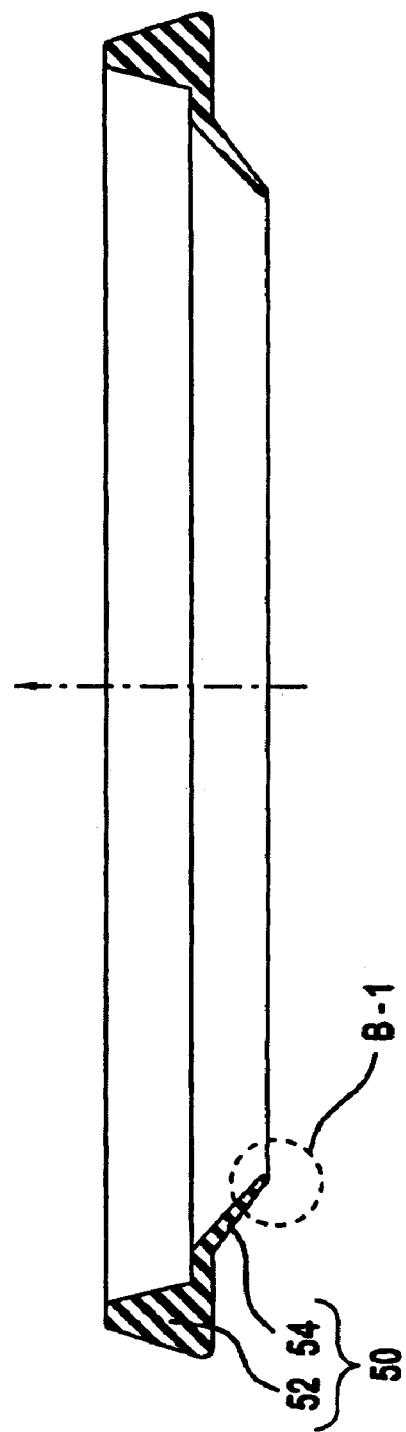
FIG. 2B

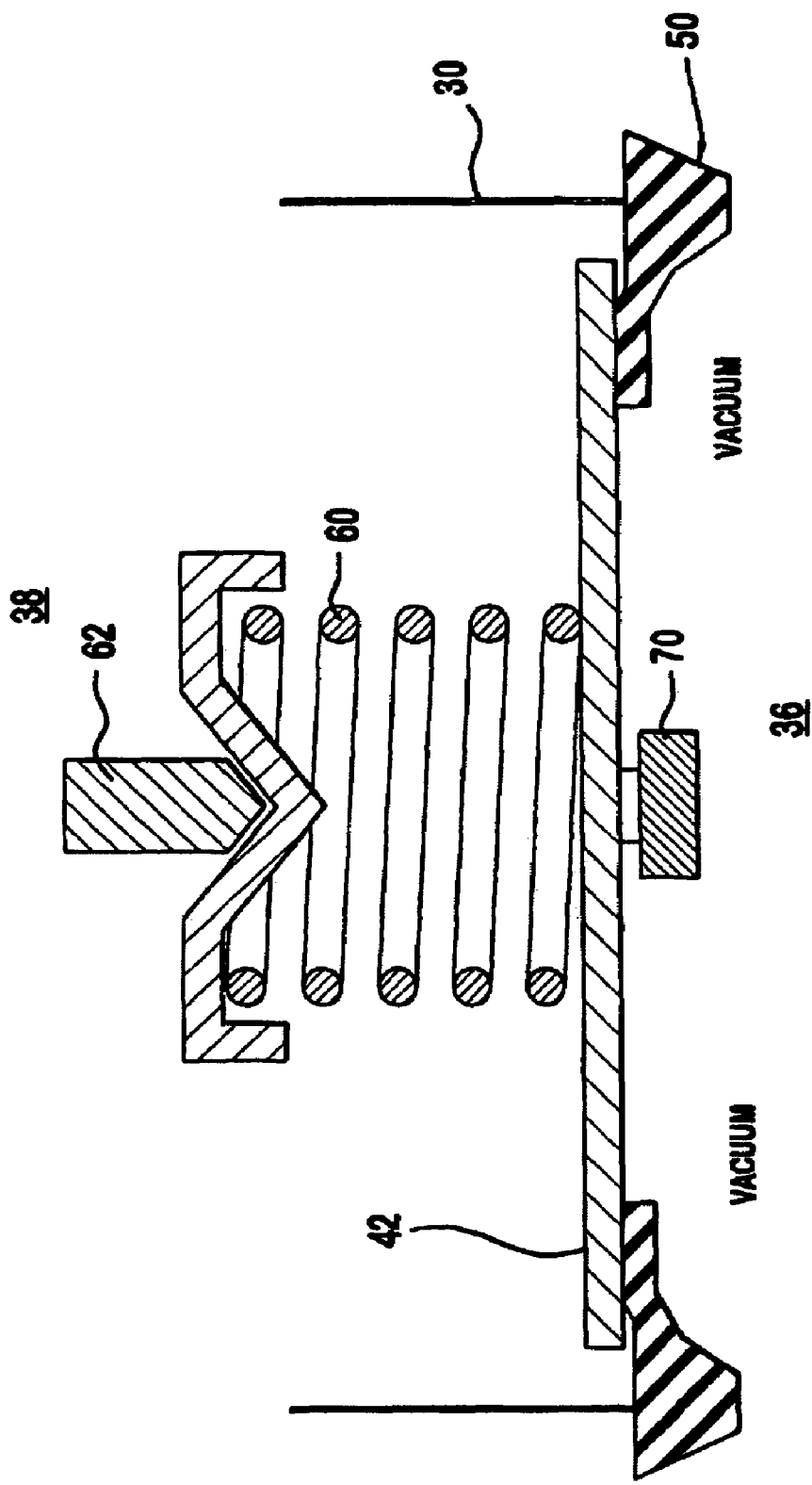

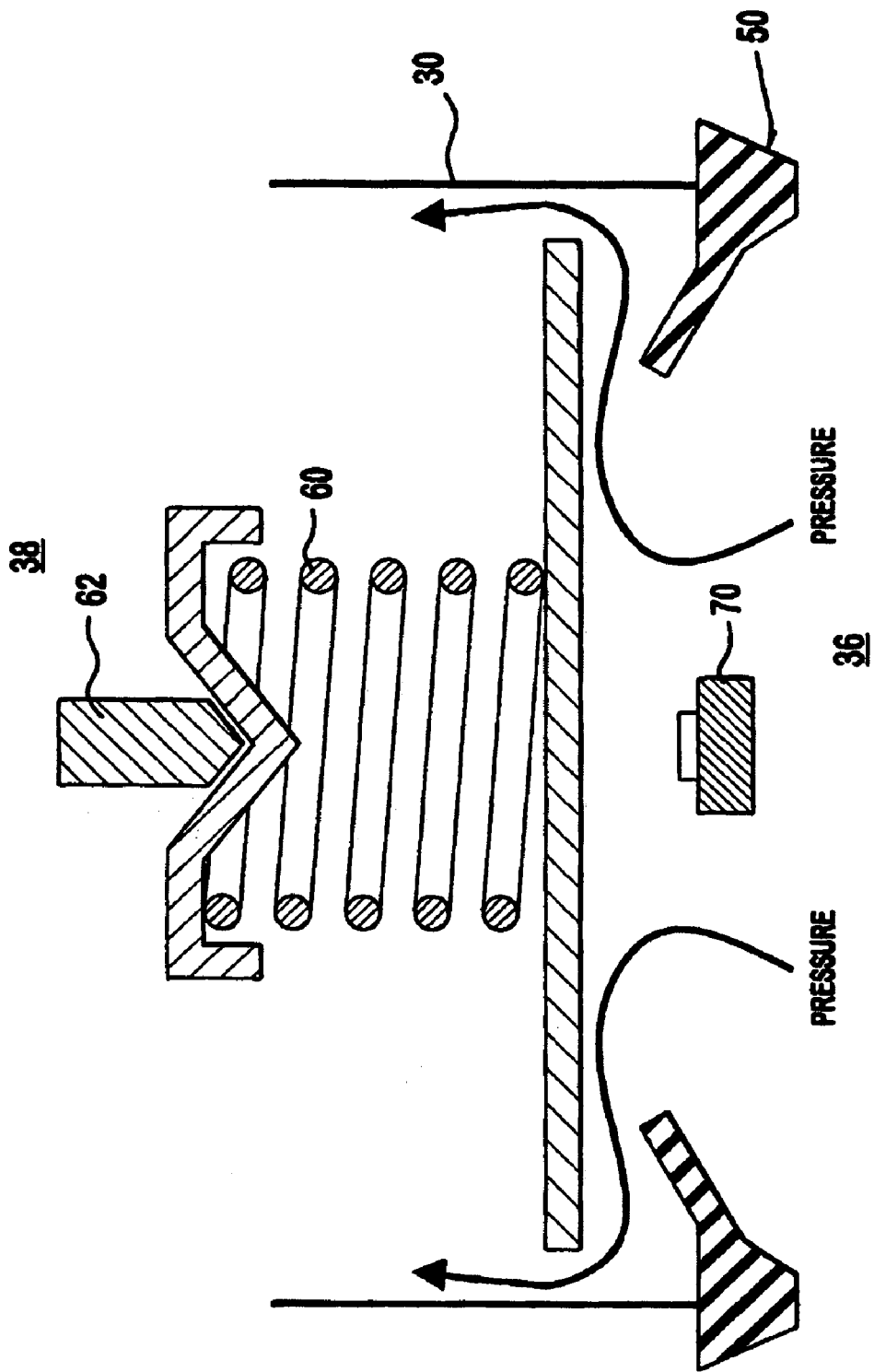

LOW POWER CONSUMPTION LATCH CIRCUIT INCLUDING A TIME DELAY FOR A FUEL VAPOR PRESSURE MANAGEMENT APPARATUS

CROSS-REFERENCE TO RELATED APPLICATIONS

This application claims the benefit of the earlier filing date of U.S. Provisional Application Nos. 60/611,023 and 60/610,989, both of which were filed 17 Sep. 2004, and both of which are incorporated by reference herein in their entirety.

FIELD OF THE INVENTION

A fuel vapor pressure management apparatus and method that manages pressure and detects leaks in a fuel system. In particular, a fuel vapor pressure management apparatus and method that vents positive pressure, vents excess negative pressure, and uses evaporative natural vacuum to perform a leak diagnostic.

BACKGROUND OF THE INVENTION

Conventional fuel systems for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such conventional fuel systems, excess fuel vapor can accumulate immediately after engine shutdown, thereby creating a positive pressure in the fuel vapor pressure management system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides a fuel vapor pressure management apparatus for an internal combustion engine. The apparatus includes a housing, a pressure operable device, and a printed circuit board. The housing defines an interior chamber. The pressure operable device moves along an axis between first and second configurations. The first configuration of the pressure operable device separates the interior chamber into first and second portions such that fluid flow between the first and second portions is prevented, and the second configuration of the pressure operable device permits fluid flow between the first and second portions. The printed circuit board is supported by the housing in the interior chamber. The printed circuit board includes a delay and a sensor. The delay commences upon internal combustion engine shutdown and concludes after a preset period. And the sensor indicates movement of the pressure operable device in the first configuration after the conclusion of the preset period.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 2B are detail views of a seal for the fuel vapor pressure management apparatus shown in FIG. 2A.

FIG. 3A is a schematic illustration of a leak detection arrangement of the fuel vapor pressure management apparatus illustrated in FIG. 1.

FIG. 3C is a schematic illustration of a pressure blow-off arrangement of the fuel vapor pressure management apparatus illustrated in FIG. 1.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
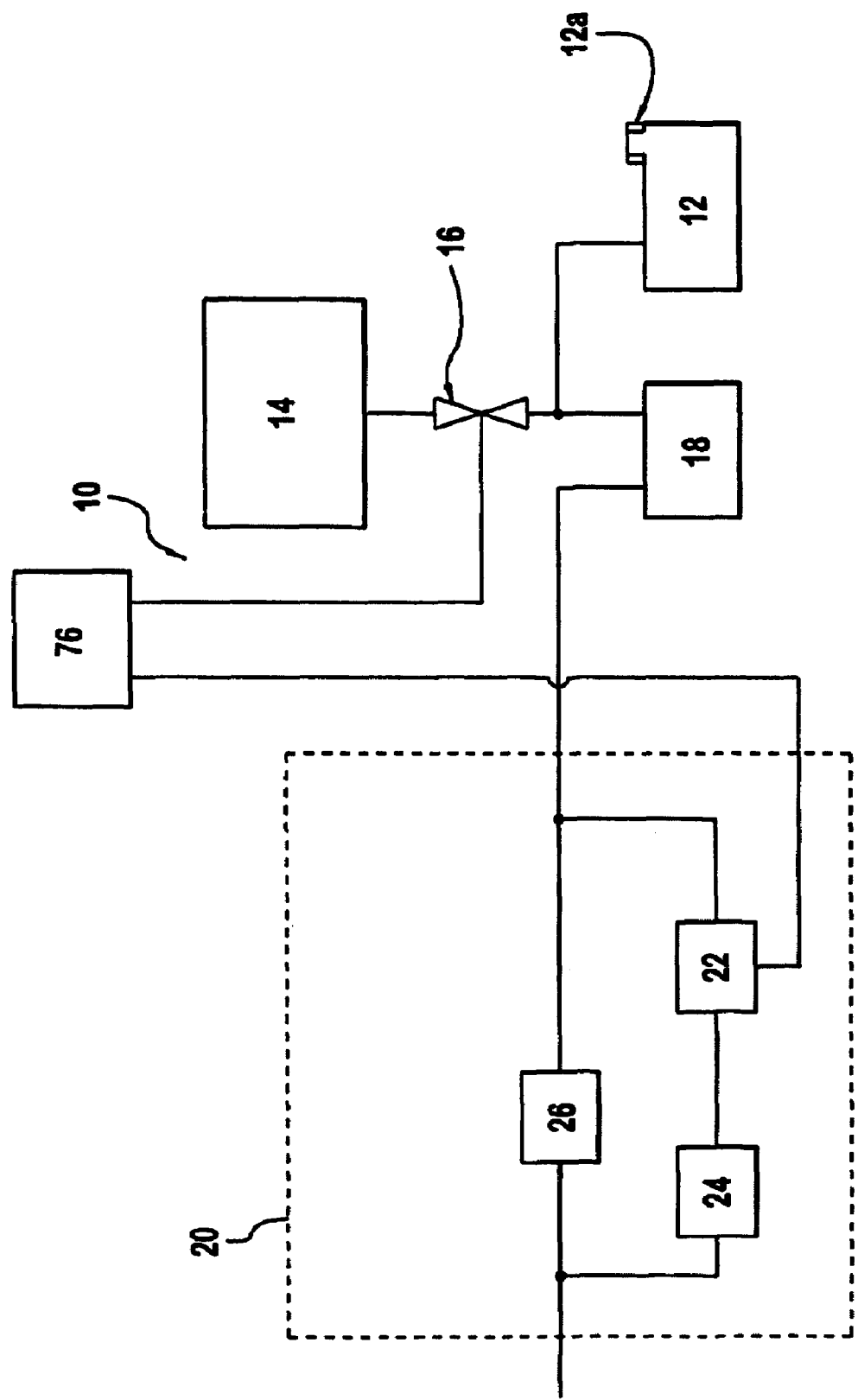
FIG. 1 is a schematic illustration of a fuel system, in accordance with the detailed description of the preferred embodiment, which includes a fuel vapor pressure management apparatus.

Referring to FIG. 1, a fuel system 10, e.g., for an engine (not shown), includes a fuel tank 12, a vacuum source 14 such as an intake manifold of the engine, a purge valve 16, a charcoal canister 18, and a fuel vapor pressure management apparatus 20.

The fuel vapor pressure management apparatus 20 performs a plurality of functions including signaling 22 that a first predetermined pressure (vacuum) level exists, "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and an algorithm, can perform large leak detection on the fuel system 10. Such large leak detection could be used to evaluate situations such as when a refueling cap 12a is not replaced on the fuel tank 12.

It is understood that volatile liquid fuels, e.g., gasoline, can evaporate under certain conditions, e.g., rising ambient temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the charcoal canister 18. According to the present description, the existence of a vacuum at the first predetermined pressure level indicates that the integrity of the fuel system 10 is satisfactory. Thus, signaling 22 is used to indicate the integrity of the fuel system 10, i.e., that there are no appreciable leaks. Subsequently, the vacuum relief 24 at a pressure level below the first predetermined pressure level can protect the fuel tank 12, e.g., can prevent structural distortion as a result of stress caused by vacuum in the fuel system 10.

After the engine is turned off, the pressure blow-off 26 allows excess pressure due to fuel evaporation to be vented, and thereby expedite the occurrence of vacuum generation that subsequently occurs during cooling. The pressure blow-off 26 allows air within the fuel system 10 to be released while fuel vapor is retained by the charcoal canister 18.

Similarly, in the course of refueling the fuel tank 12, the pressure blow-off 26 allows air to exit the fuel tank 12 at a high rate of flow.

At least two advantages are achieved in accordance with a system including the fuel vapor pressure management apparatus 20. First, a leak detection diagnostic can be performed on fuel tanks of all sizes. This advantage is significant in that previous systems for detecting leaks were not effective with known large volume fuel tanks, e.g., 100 gallons or more. Second, the fuel vapor pressure management apparatus 20 is compatible with a number of different types of the purge valves, including digital and proportional purge valves.

Figure 2A:
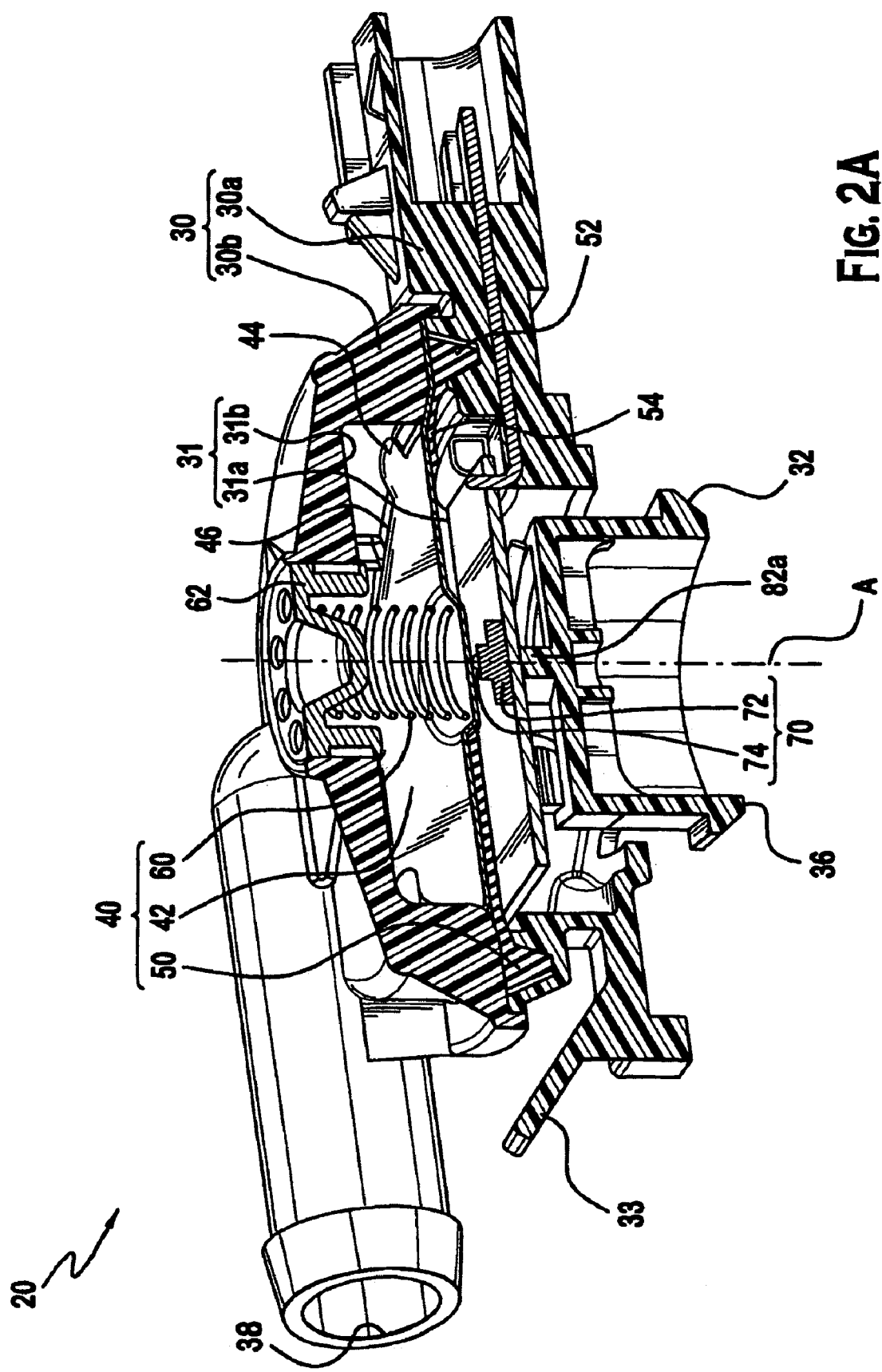
FIG. 2A is a cross sectional view of a first preferred embodiment of the fuel vapor pressure management apparatus illustrated in FIG. 1.

FIG. 2A shows an embodiment of the fuel vapor pressure management apparatus 20 that is particularly suited to being mounted on the charcoal canister 18. The fuel vapor pressure management apparatus 20 includes a housing 30 that can be mounted to the body of the charcoal canister 18 by a "bayonet" style attachment 32. A seal (not shown) can be interposed between the charcoal canister 18 and the fuel vapor pressure management apparatus 20 so as to provide a fluid tight connection. The attachment 32, in combination with a snap finger 33, allows the fuel vapor pressure management apparatus 20 to be readily serviced in the field. Of course, different styles of attachments between the fuel vapor pressure management apparatus 20 and the body of the charcoal canister 18 can be substituted for the illustrated bayonet attachment 32. Examples of different attachments include a threaded attachment, and an interlocking telescopic attachment. Alternatively, the charcoal canister 18 and the housing 30 can be bonded together (e.g., using an adhesive), or the body of the charcoal canister 18 and the housing 30 can be interconnected via an intermediate member such as a rigid pipe or a flexible hose.

The housing 30 defines an interior chamber 31 and can be an assembly of a first housing part 30a and a second housing part 30b. The first housing part 30a includes a first port 36 that provides fluid communication between the charcoal canister 18 and the interior chamber 31. The second housing part 30b includes a second port 38 that provides fluid communication, e.g., venting, between the interior chamber 31 and the ambient atmosphere. A filter (not shown) can be interposed between the second port 38 and the ambient atmosphere for reducing contaminants that could be drawn into the fuel vapor pressure management apparatus 20 during the vacuum relief 24 or during operation of the purge valve 16.

In general, it is desirable to minimize the number of housing parts to reduce the number of potential leak points, i.e., between housing pieces, which must be sealed.

An advantage of the fuel vapor pressure management apparatus 20 is its compact size. The volume occupied by the fuel vapor pressure management apparatus 20, including the interior chamber 31, is less than all other known leak detection devices, the smallest of which occupies more than 240 cubic centimeters. That is to say, the fuel vapor pressure management apparatus 20, from the first port 36 to the second port 38 and including the interior chamber 31, occupies less than 240 cubic centimeters. In particular, the fuel vapor pressure management apparatus 20 occupies a volume of less than 100 cubic centimeters. This size reduction over known leak detection devices is significant given the limited availability of space in contemporary automobiles.

A pressure operable device 40 can separate the interior chamber 31 into a first portion 31a and a second portion 31b. The first portion 31a is in fluid communication with the charcoal canister 18 through the first port 36, and the second portion 31*b* is in fluid communication with the ambient atmosphere through the second port 38.

The pressure operable device 40 includes a poppet 42, a seal 50, and a resilient element 60. During the signaling 22, the poppet 42 and the seal 50 cooperatively engage one another to prevent fluid communication between the first and second ports 36,38. During the vacuum relief 24, the poppet 42 and the seal 50 cooperatively engage one another to permit restricted fluid flow from the second port 38 to the first port 36. During the pressure blow-off 26, the poppet 42 and the seal 50 disengage one another to permit substantially unrestricted fluid flow from the first port 36 to the second port 38.

The pressure operable device 40, with its different arrangements of the poppet 42 and the seal 50, may be considered to constitute a bi-directional check valve. That is to say, under a first set of conditions, the pressure operable device 40 permits fluid flow along a path in one direction, and under a second set of conditions, the same pressure operable device 40 permits fluid flow along the same path in the opposite direction. The volume of fluid flow during the pressure blow-off 26 may be three to ten times as great as the volume of fluid flow during the vacuum relief 24.

The pressure operable device 40 operates without an electromechanical actuator, such as a solenoid that is used in a known leak detection device to controllably displace a fluid flow control valve. Thus, the operation of the pressure operable device 40 can be controlled exclusively by the pressure differential between the first and second ports 36,38. Preferably, all operations of the pressure operable device 40 are controlled by fluid pressure signals that act on one side, i.e., the first port 36 side, of the pressure operable device 40.

The pressure operable device 40 also operates without a diaphragm. Such a diaphragm is used in the known leak detection device to sub-partition an interior chamber and to actuate the flow control valve. Thus, the pressure operable device 40 exclusively separates, and then only intermittently, the interior chamber 31. That is to say, there are at most two portions of the interior chamber 31 that are defined by the housing 30.

The poppet 42 is preferably a low density, substantially rigid disk through which fluid flow is prevented. The poppet 42 can be flat or formed with contours, e.g., to enhance rigidity or to facilitate interaction with other components of the pressure operable device 40.

The poppet 42 can have a generally circular form that includes alternating tabs 44 and recesses 46 around the perimeter of the poppet 42. The tabs 44 can center the poppet 42 within the second housing part 30*b*, and guide movement of the poppet 42 along an axis A. The recesses 46 can provide a fluid flow path around the poppet 42, e.g., during the vacuum relief 24 or during the pressure blow-off 26. A plurality of alternating tabs 44 and recesses 46 are illustrated, however, there could be any number of tabs 44 or recesses 46, including none, e.g., a disk having a circular perimeter. Of course, other forms and shapes may be used for the poppet 42.

The poppet 42 can be made of any metal (e.g., aluminum), polymer (e.g., nylon), or another material that is impervious to fuel vapor, is low density, is substantially rigid, and has a smooth surface finish. The poppet 42 can be manufactured by stamping, casting, or molding. Of course, other materials and manufacturing techniques may be used for the poppet 42.

The seal 50 can have an annular form including a bead 52 and a lip 54. The bead 52 can be secured between and seal the first housing part 30*a* with respect to the second housing part 30*b*. The lip 54 can project radially inward from the bead 52 and, in its undeformed configuration, i.e., as-molded or otherwise produced, project obliquely with respect to the axis A. Thus, preferably, the lip 54 has the form of a hollow frustum. The seal 50 can be made of any material that is sufficiently elastic to permit many cycles of flexing the seal 50 between undeformed and deformed configurations.

Preferably, the seal 50 is molded from rubber or a polymer, e.g., nitriles or fluorosilicones. More preferably, the seal has a stiffness of approximately 50 durometer (Shore A), and is self-lubricating or has an anti-friction coating, e.g., polytetrafluoroethylene.

FIG. 2B shows an exemplary embodiment of the seal 50, including the relative proportions of the different features. Preferably, this exemplary embodiment of the seal 50 is made of Santoprene 123-40.

The resilient element 60 biases the poppet 42 toward the seal 50. The resilient element 60 can be a coil spring that is positioned between the poppet 42 and the second housing part 30*b*. Preferably, such a coil spring is centered about the axis A.

Different embodiments of the resilient element 60 can include more than one coil spring, a leaf spring, or an elastic block. The different embodiments can also include various materials, e.g., metals or polymers. And the resilient element 60 can be located differently, e.g., positioned between the first housing part 30*a* and the poppet 42.

It is also possible to use the weight of the poppet 42, in combination with the force of gravity, to urge the poppet 42 toward the seal 50. As such, the biasing force supplied by the resilient element 60 could be reduced or eliminated.

The resilient element 60 provides a biasing force that can be calibrated to set the value of the first predetermined pressure level. The construction of the resilient element 60, in particular the spring rate and length of the resilient member, can be provided so as to set the value of the second predetermined pressure level.

A switch 70 can perform the signaling 22. Preferably, movement of the poppet 42 along the axis A actuates the switch 70. The switch 70 can include a first contact fixed with respect to a body 72 and a movable contact 74. The body 72 can be fixed with respect to the housing 30, e.g., the first housing part 30*a*, and movement of the poppet 42 displaces movable contact 74 relative to the body 72, thereby closing or opening an electrical circuit in which the switch 70 is connected. In general, the switch 70 is selected so as to require a minimal actuation force, e.g., 50 grams or less, to displace the movable contact 74 relative to the body 72.

Different embodiments of the switch 70 can include magnetic proximity switches, piezoelectric contact sensors, or any other type of device capable of signaling that the poppet 42 has moved to a prescribed position or that the poppet 42 is exerting a prescribed force on the movable contact 74. According to an example of an alternative embodiment of the switch 70, the movable contact 74 can be a domed metal piece that can be pressed, in an over-center or snap motion, by the poppet 42 into a flattened state so as to make electrical contact with the stationary contact 72, which is located under the dome of the movable contact 74. An example of such a switch is the Panasonic EVQ.

Figure 2C:
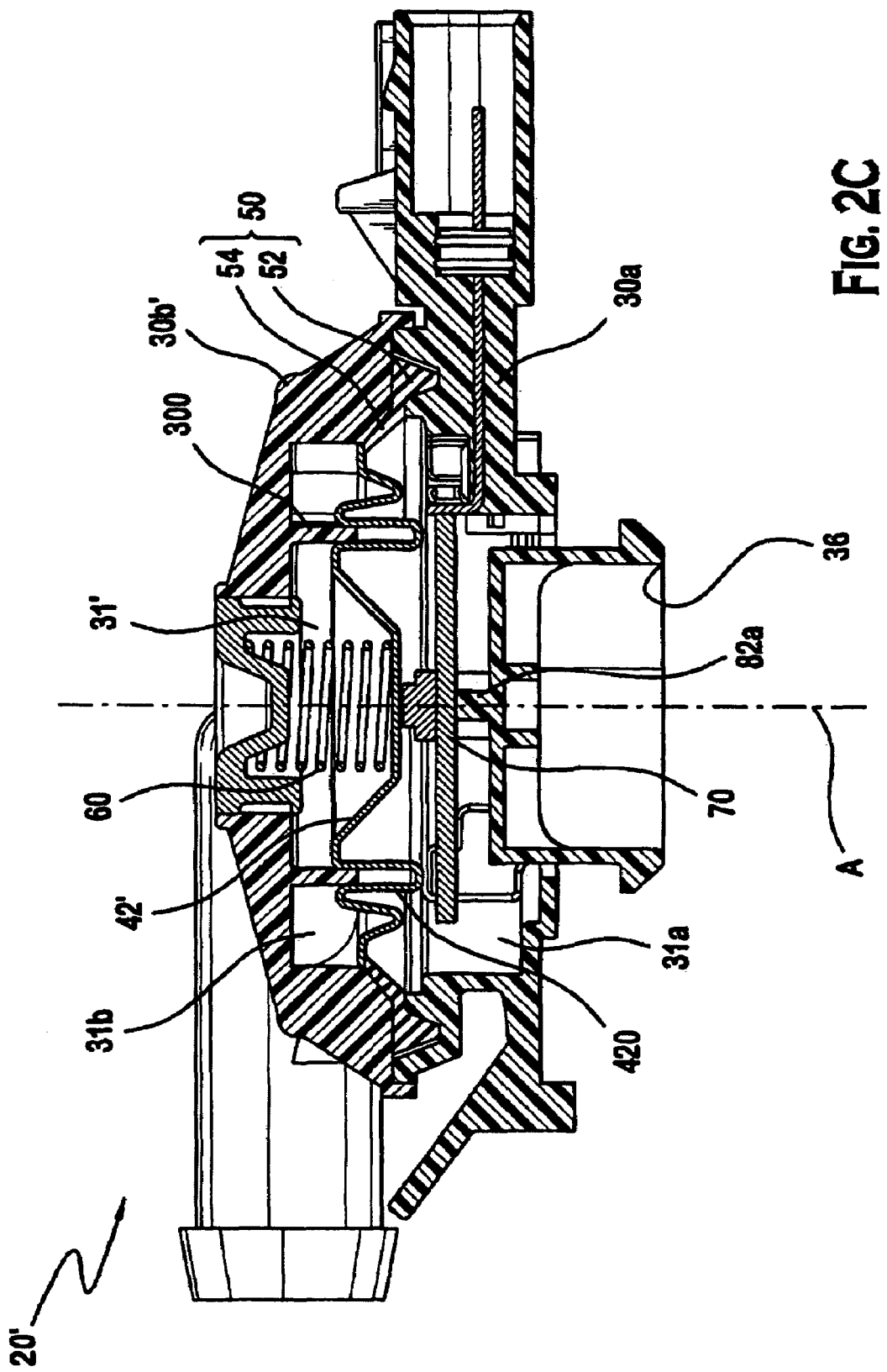
FIG. 2C is a cross sectional view of a second preferred embodiment of the fuel vapor pressure management apparatus illustrated in FIG. 1.

Referring now to FIG. 2C, there is shown an alternate embodiment of the fuel vapor pressure management apparatus 20'. As compared to FIG. 2A, the fuel vapor pressure management apparatus 20' provides an alternative second housing part 30b' and an alternate poppet 42'. Otherwise, the same reference numbers are used to identify similar parts in the two embodiments of the fuel vapor pressure management apparatus 20 and 20'.

The second housing part 30b' includes a wall 300 projecting into the chamber 31 and surrounding the axis A. The poppet 42' includes at least one corrugation 420 that also surrounds the axis A. The wall 300 and the at least one corrugation 420 are sized and arranged with respect to one another such that the corrugation 420 telescopically receives the wall 300 as the poppet 42' moves along the axis A, i.e., to provide a dashpot type structure. Preferably, the wall 300 and the at least one corrugation 420 are right-circle cylinders.

The wall 300 and the at least one corrugation 420 cooperatively define a sub-chamber 310 within the chamber 31'. Movement of the poppet 42' along the axis A causes fluid displacement between the chamber 31' and the sub-chamber 310. This fluid displacement has the effect of damping resonance of the poppet 42'. A metering aperture (not show) could be provided to define a dedicated flow channel for the displacement of fluid between the chamber 31' and the sub-chamber 310'.

As it is shown in FIG. 2C, the poppet 42' can include additional corrugations that can enhance the rigidity of the poppet 42', particularly in the areas at the interfaces with the seal 50 and the resilient element 60.

The signaling 22 occurs when vacuum at the first predetermined pressure level is present at the first port 36. During the signaling 22, the poppet 42 and the seal 50 cooperatively engage one another to prevent fluid communication between the first and second ports 36,38.

The force created as a result of vacuum at the first port 36 causes the poppet 42 to be displaced toward the first housing part 30a. This displacement is opposed by elastic deformation of the seal 50. At the first predetermined pressure level, e.g., one inch of water vacuum relative to the atmospheric pressure, displacement of the poppet 42 will actuate the switch 70, thereby opening or closing an electrical circuit that can be monitored by an electronic control unit 74. As vacuum is released, i.e., the pressure at the first port 36 rises above the first predetermined pressure level, the elasticity of the seal 50 pushes the poppet 42 away from the switch 70, thereby resetting the switch 70.

During the signaling 22, there is a combination of forces that act on the poppet 42, i.e., the vacuum force at the first port 36 and the biasing force of the resilient element 60. This combination of forces moves the poppet 42 along the axis A to a position that deforms the seal 50 in a substantially symmetrical manner. This arrangement of the poppet 42 and seal 50 are schematically indicated in FIG. 3A. In particular, the poppet 42 has been moved to its extreme position against the switch 70, and the lip 54 has been substantially uniformly pressed against the poppet 42 such that there is, preferably, annular contact between the lip 54 and the poppet 42.

In the course of the seal 50 being deformed during the signaling 22, the lip 54 slides along the poppet 42 and performs a cleaning function by scraping-off any debris that may be on the poppet 42.

The vacuum relief 24 occurs as the pressure at the first port 36 further decreases, i.e., the pressure decreases below the first predetermined pressure level that actuates the switch 70. At some level of vacuum that is below the first predetermined level, e.g., six inches of water vacuum relative to atmosphere, the vacuum acting on the seal 50 will deform the lip 54 so as to at least partially disengage from the poppet 42.

Figure 3B:
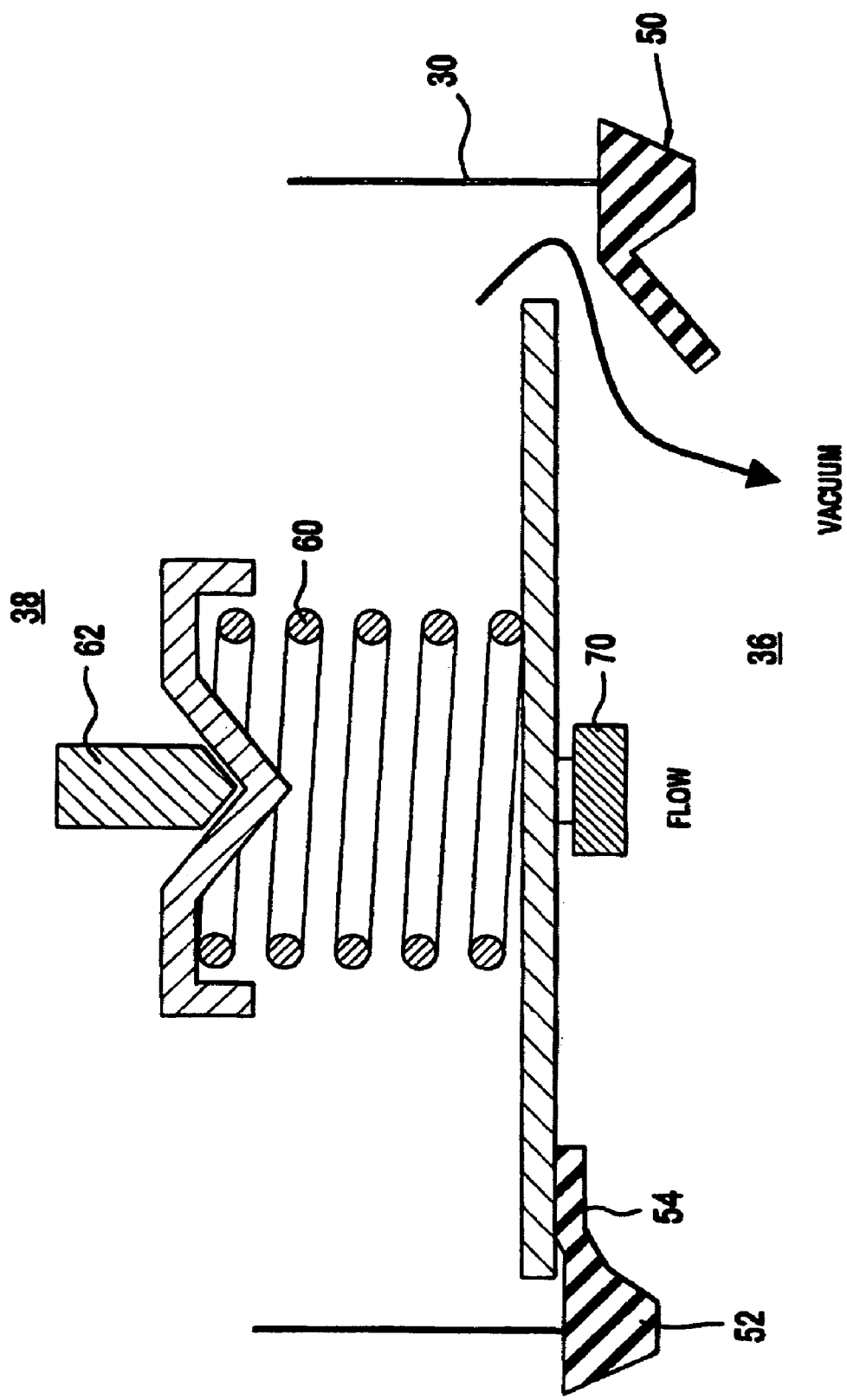
FIG. 3B is a schematic illustration of a vacuum relief arrangement of the fuel vapor pressure management apparatus illustrated in FIG. 1.

During the vacuum relief 24, it is believed that, at least initially, the vacuum relief 24 causes the seal 50 to deform in an asymmetrical manner. This arrangement of the poppet 42 and seal 50 are schematically indicated in FIG. 3B. A weakened section of the seal 50 could facilitate propagation of the deformation. In particular, as the pressure decreases below the first predetermined pressure level, the vacuum force acting on the seal 50 will, at least initially, cause a gap between the lip 54 and the poppet 42. That is to say, a portion of the lip 54 will disengage from the poppet 42 such that there will be a break in the annular contact between the lip 54 and the poppet 42, which was established during the signaling 22. The vacuum force acting on the seal 50 will be relieved as fluid, e.g., ambient air, flows from the atmosphere, through the second port 38, through the gap between the lip 54 and the poppet 42, through the first port 36, and into the canister 18.

The fluid flow that occurs during the vacuum relief 24 is restricted by the size of the gap between the lip 54 and the poppet 42. It is believed that the size of the gap between the lip 54 and the poppet 42 is related to the level of the pressure below the first predetermined pressure level. Thus, a small gap is all that is formed to relieve pressure slightly below the first predetermined pressure level, and a larger gap is formed to relieve pressure that is significantly below the first predetermined pressure level. This resizing of the gap is performed automatically by the seal 50 in accordance with the construction of the lip 54, and is believed to eliminate pulsations due to repeatedly disengaging and reengaging the seal 50 with respect to the poppet 42. Such pulsations could arise due to the vacuum force being relieved momentarily during disengagement, but then building back up as soon as the seal 50 is reengaged with the poppet 42.

Referring now to FIG. 3C, the pressure blow-off 26 occurs when there is a positive pressure above a second predetermined pressure level at the first port 36. For example, the pressure blow-off 26 can occur when the tank 12 is being refueled. During the pressure blow-off 26, the poppet 42 is displaced against the biasing force of the resilient element 60 so as to space the poppet 42 from the lip 54. That is to say, the poppet 42 will completely separate from the lip 54 so as to eliminate the annular contact between the lip 54 and the poppet 42, which was established during the signaling 22. This separation of the poppet 42 from the seal 50 enables the lip 54 to assume an undeformed configuration, i.e., it returns to its "as-originally-manufactured" configuration. The pressure at the second predetermined pressure level will be relieved as fluid flows from the canister 18, through the first port 36, through the space between the lip 54 and the poppet 42, through the second port 38, and into the atmosphere.

The fluid flow that occurs during the pressure blow-off 26 is substantially unrestricted by the space between the poppet 42 and the lip 54. That is to say, the space between the poppet 42 and the lip 54 presents very little restriction to the fluid flow between the first and second ports 36,38.

Figure 4:
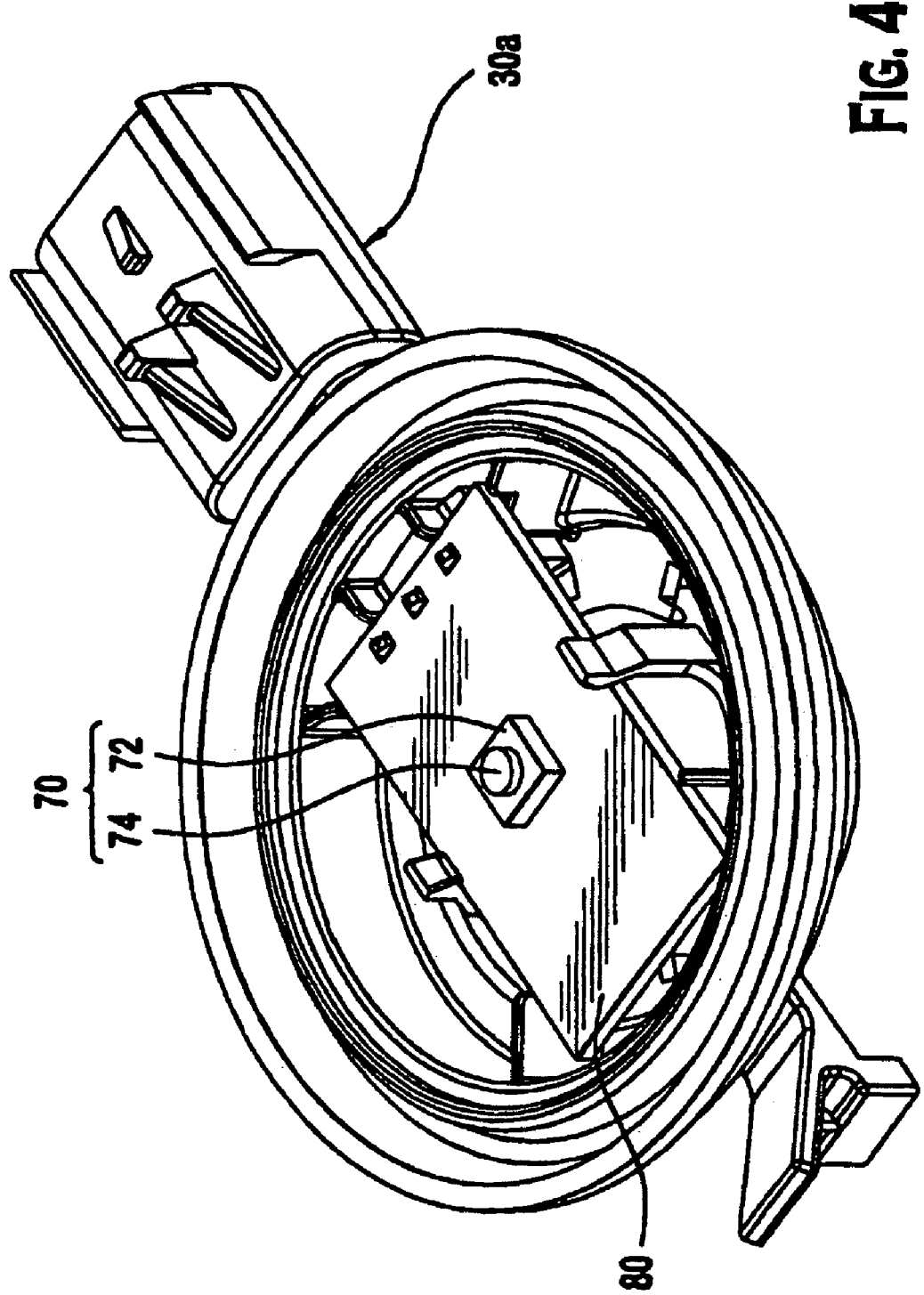
FIG. 4 is a detail view showing a printed circuit board of the fuel vapor pressure management apparatus illustrated in FIG. 1.

Referring additionally to FIG. 4, a printed circuit board 80 is shown mounted on first housing part 30a. The printed circuit board 80 supports the switch 70 in the proper position to be actuated by the poppet 42 when the first predetermined pressure level occurs in the vapor pressure canister 18.

The fuel vapor pressure management apparatus 20 enables different levels of capabilities by providing additional functions on the printed circuit board 80. According to one embodiment, only the electrical lines necessary to connect the stationary and movable contacts 72,74 are printed on the printed circuit board 80. However, according to another embodiment, various functions and levels of logic can be moved from the electronic control unit 76 to the printed circuit board 80 by printing additional control circuit features on the printed circuit board 80. Examples of preferred features that may be incorporated on the printed circuit board 80 include: 1) a latch that is controlled by the switch 70, and/or 2) a delay that postpones determining the state of the switch 70.

According to the first preferred control circuit feature on the printed circuit board 80, when the switch 70 is actuated, a latch may hold an indication of the switch actuating condition, e.g., signaling 22, until the latch is reset. There are a number of advantages for such a latch, including eliminating the need for the electronic control unit 76 to be active when the engine is turned off, thereby conserving battery power. It is desirable to limit average current consumption by the latch to less than 100 microamperes, since the fuel vapor pressure management apparatus 20 operates when the engine is turned off.

According to a preferred embodiment, a combination of digital and analog circuit components are used for a latch circuit 82. Of course, other embodiments may be made entirely of analog circuitry components, entirely of digital circuitry components, with microprocessor controlled circuitry, or some combinations of these circuit architectures. In general, analog circuitry components are believed to provide good dimensional packaging size and low cost, but are believe to suffer from poor current consumption and are not always suitable for typical automotive voltage ranges (e.g., 0-15 volts). Digital circuitry components are believed to provide good dimensional packaging size, low cost, and are suitable for typical automotive voltage ranges, but are believe to also suffer from poor current consumption. Microprocessor control circuitry is believed to provide good current consumption (e.g., in a so-called "sleep mode"), but is believed to suffer from poor dimensional packaging size, high cost, and is not always suitable for typical automotive voltage ranges.

The latch circuit 82 preferably includes complementary metal-oxide semiconductor (CMOS) digital components, which function well in typical automotive vehicle ranges and provide good power dissipation as compared to, for example, transistor-to-transistor logic digital components. Of course, other types of digital components may be used in the latch circuit 82.

The selection of CMOS options for implementing the latch circuit 82 include flip-flops, basic combinational logic techniques such as simple OR and AND gates, one shot multivibrators, and set/reset latches. A JK flip flop provides low current consumption and can remember its previous state, but requires additional circuitry for a clock signal. Combinational logic techniques also provide low current consumption, but cannot remember their previous state. Similarly, a one shot multivibrator does not know its previous state when power to the device is pulsed on/off. According to a preferred embodiment, the latch circuit 82 includes a set/reset latch 83 that provides low current consumption, can remember its previous state, and does not require additional circuitry, such as an external clock.

Figure 5A:
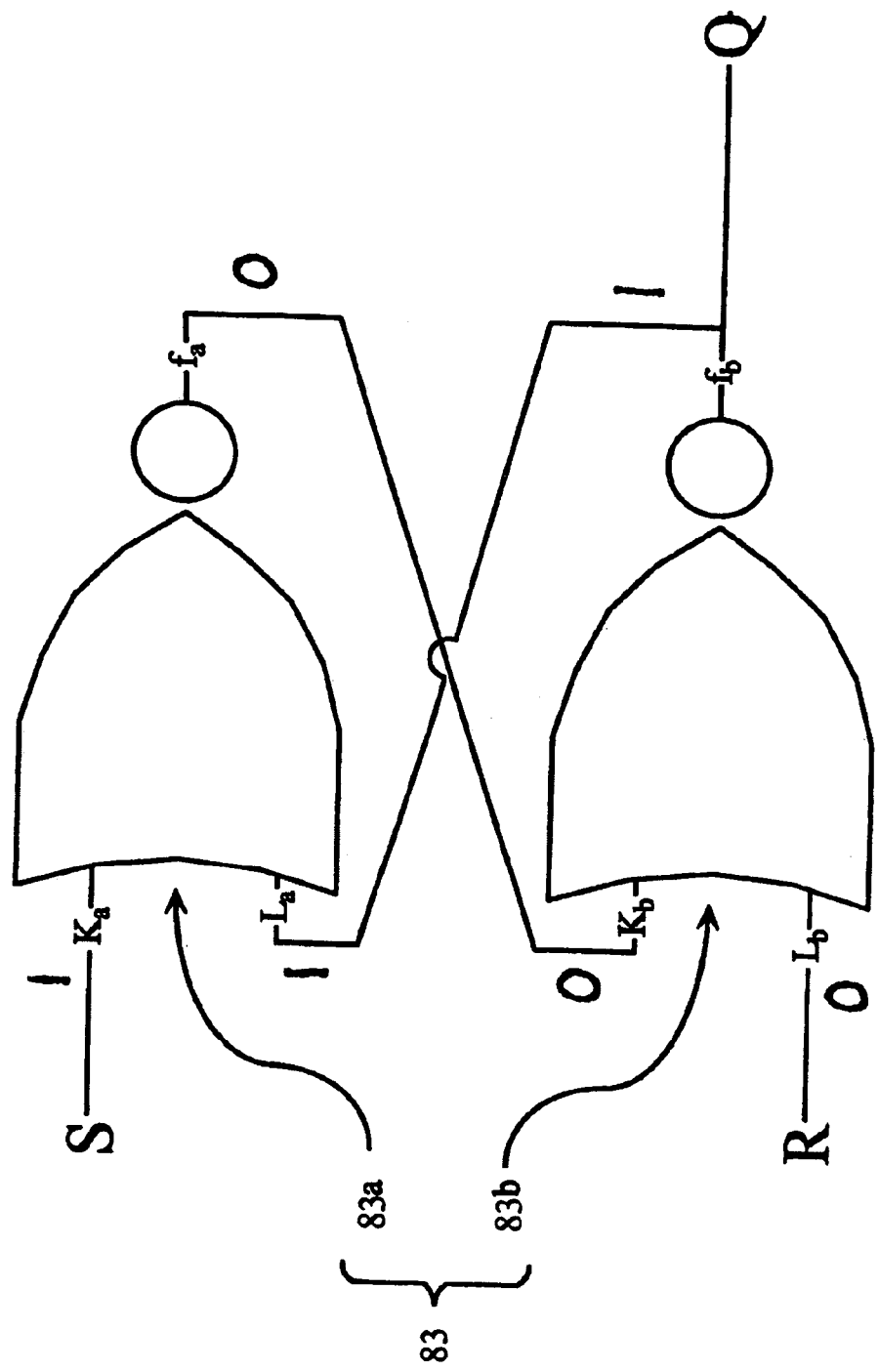
FIGS. 5A, 5B, and 5C illustration the operation or a set/reset latch.
Figure 5B:
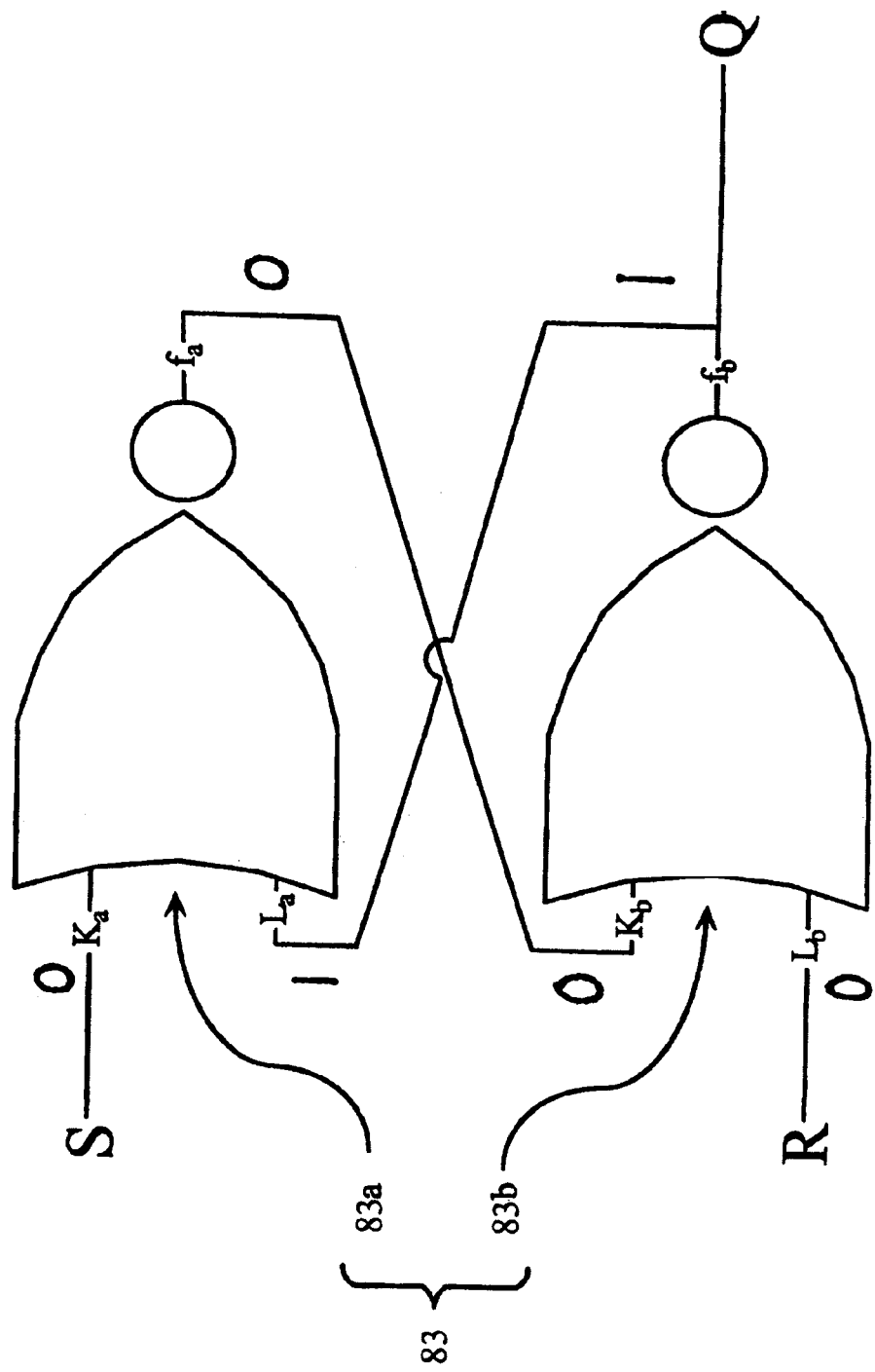
Figure 5C:
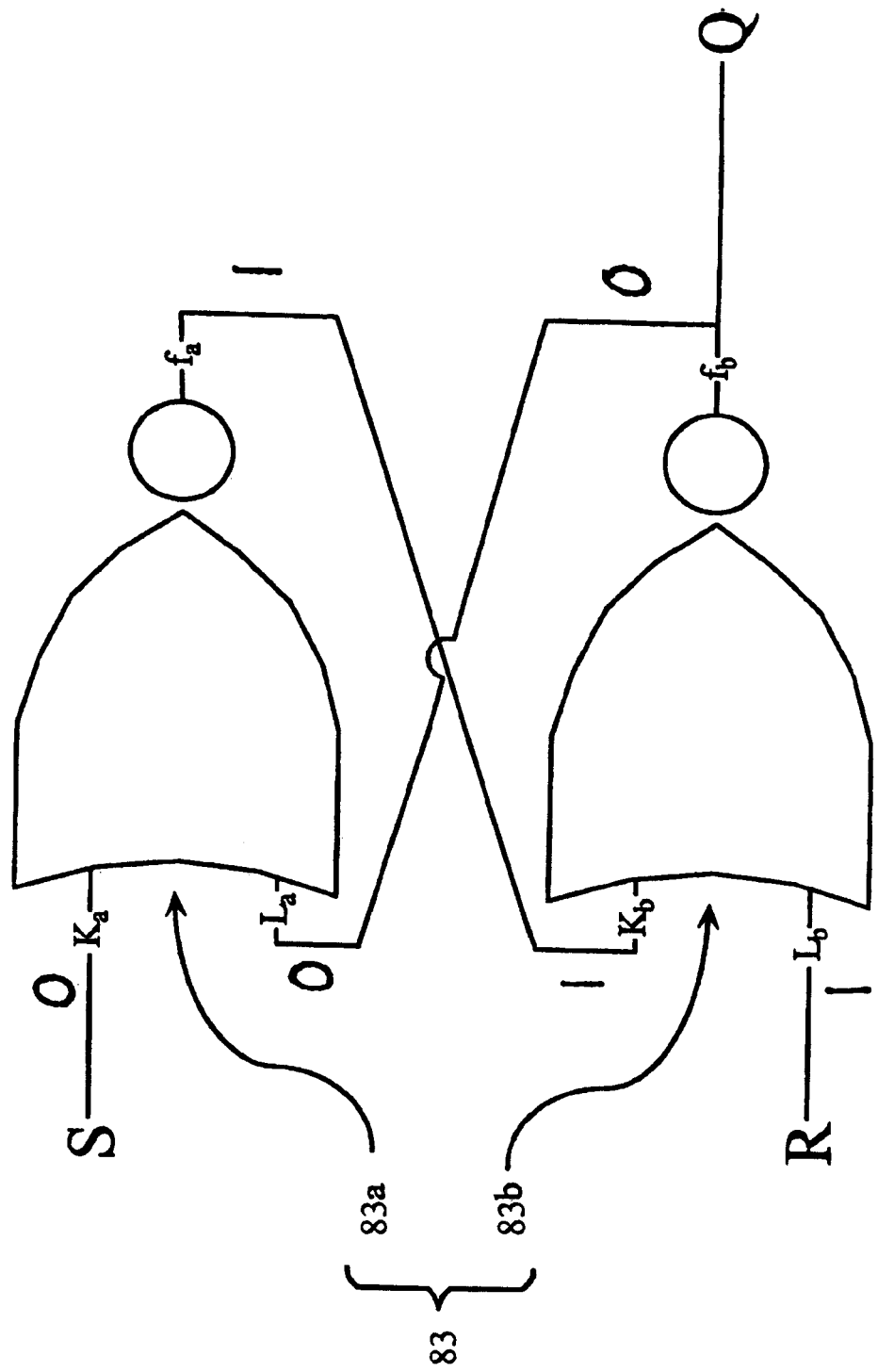

Operation of the set/reset latch 84 will now be described with reference to FIGS. 5A, 5B, and 5C. Referring initially to FIG. 5A, the set/reset latch 83 includes two NOR gates 83a and 83b. When the set input S, e.g., $K_a$ input of NOR gate 83a, is logic 1 and the reset input R, e.g., $L_a$ input of NOR gate 83b, is logic 0, then output Q is logic 1. The output $f_a$ of NOR gate 83a will be the complement of output Q As shown in FIG. 5B, set input S goes from logic 1 to logic 0, and reset input R remains logic 0. Since output Q was previously logic 1, then output $f_a$ of NOR gate 83a will remain logic 0. Thus, if set input S changes from logic 1 to logic 0, output Q will not change, i.e., remains at logic 1. Referring now to FIG. 5C, reset input R goes from logic 0 to logic 1, which ensures that output Q is logic 0, and the two logic 0 at the inputs $K_a$ and $L_a$ of NOR gate 83a ensure that output $f_a$ of NOR gate 83a is logic 0.

If reset input R goes from logic 0 to logic 1, while set input S remains at logic 0, input $K_b$ of NOR gate 83b is logic 1. Thus, the transition from logic 0 to logic 1 at reset input R does not make any difference. Output $f_a$ of NOR gate 83a remains at logic 1. However, if reset input R goes from logic 1 to logic 0 and set input S is at logic 0, i.e., both set input S and reset input R are at logic 0, then output Q must be logic 0.

Thus, latch 82 is capable of remembering the last state of inputs S and R in the sense that it remembers which one of the two inputs S and R was last at logic 1. An example of a preferred set/reset latch 83 is part number CD4001BCM.

Figure 6:
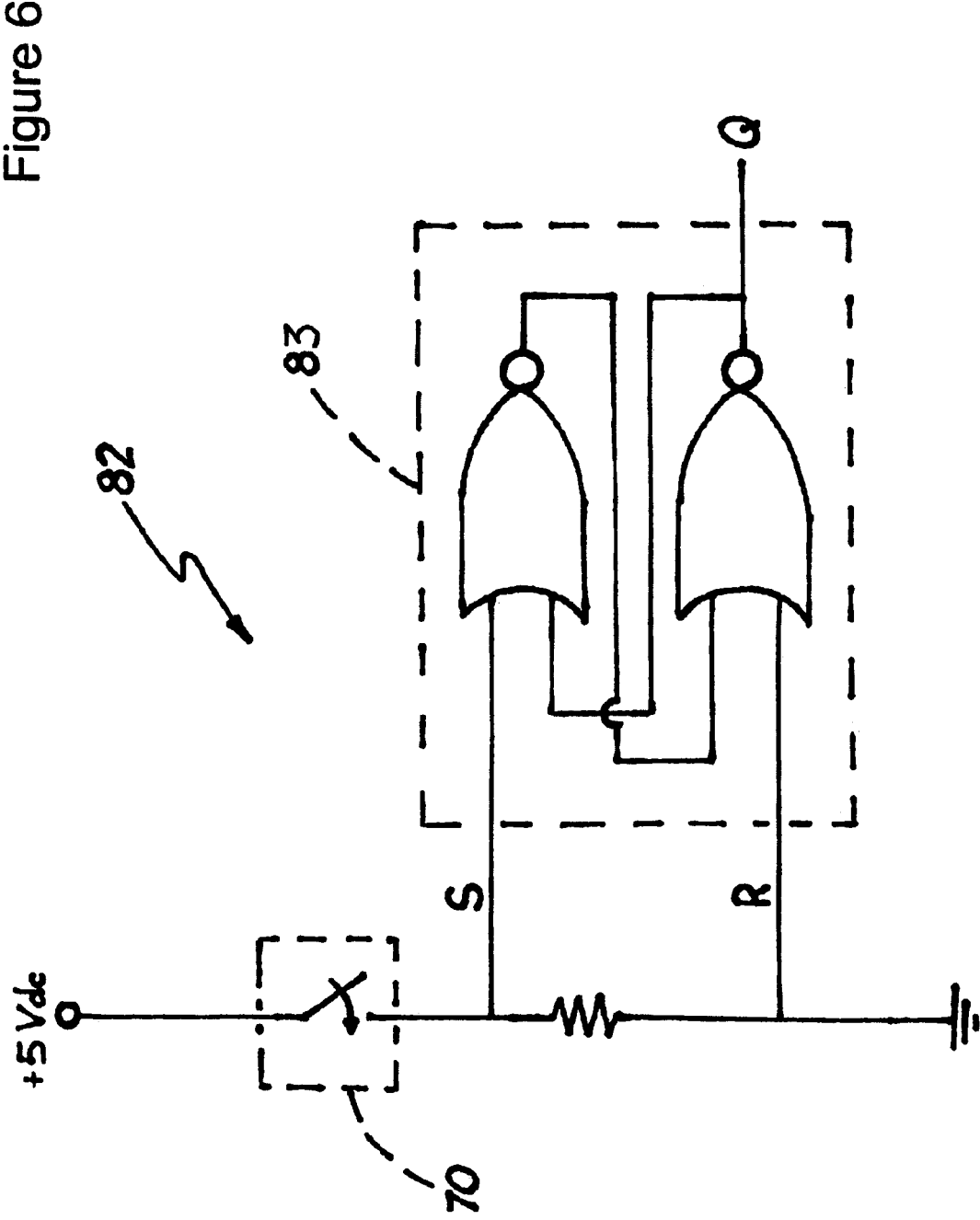
FIG. 6 shows a first preferred embodiment of a latch circuit for the printed circuit board illustrated in FIG. 4.

FIG. 6 shows a first preferred embodiment of a latch circuit 82 including switch 70 and latch 83. Switch 70 is electrically coupled to set input S and reset input R is grounded. When switch 70 is open, output Q is at logic 0, and during closure of switch 70, output Q is at logic 1. When switch 70 is left closed, and power is shut off to the circuit and then turned back on, output Q is again logic 1.

Figure 7:
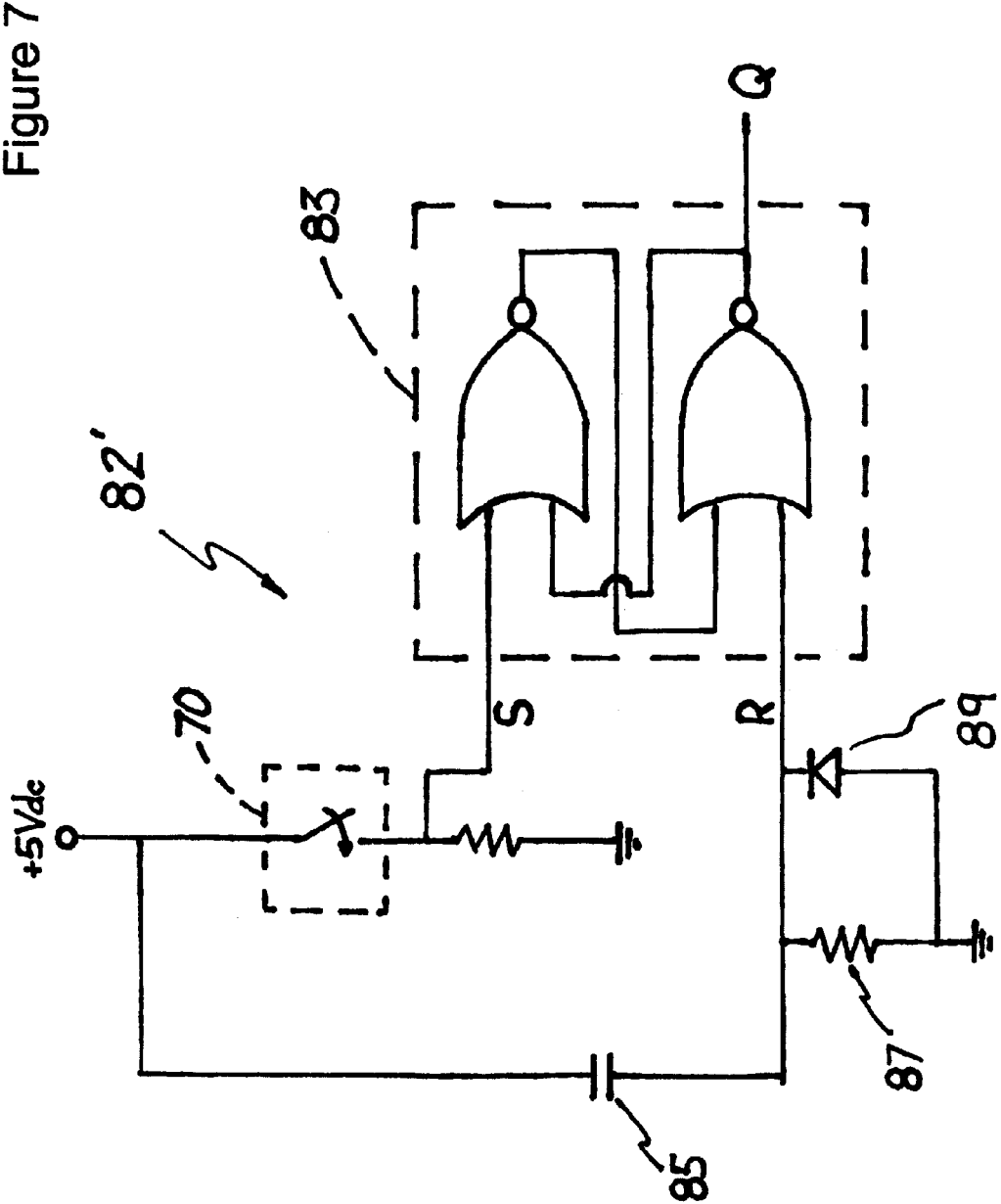
FIG. 7 shows a second preferred embodiment of a latch circuit for the printed circuit board illustrated in FIG. 4.

FIG. 7 shows a second preferred embodiment of a latch circuit 82' including switch 70 and latch 83. If, at power-up, the inputs S and R are both at logic 0, output Q holds at the previous state, but whether this state was logic 0 or logic 1 could not be "known" insofar as the power was off. By incorporating extra capacitance so as to put reset input R at logic 1 for a very short time period, the latch circuit 82' always has an output Q at logic 0, even during occurrences of inputs S and R both being at logic 0 at power-up. In particular, capacitor 85 and resistor 87 off reset input R create an initial transient spike at the beginning of the first positive power-on edge of the on/off pulse, which put reset input R at logic 1 for a brief duration (e.g., less than two milliseconds). Thus, putting reset line R at logic 1, regardless of the state of output $f_a$ of NOR gate 83a, always puts output Q initially at logic 0. The state of output Q may now become either logic 0 or logic 1 depending on the state of set input S.

Diode 89 eliminates a negative transient spike produced by capacitor 85 so as to eliminate the possibility of damaging latch 83. In particular, some preferred examples of latch 83 (e.g., part number CD4001BCM) are not designed to operate with negative voltage supplies.

Figure 8:
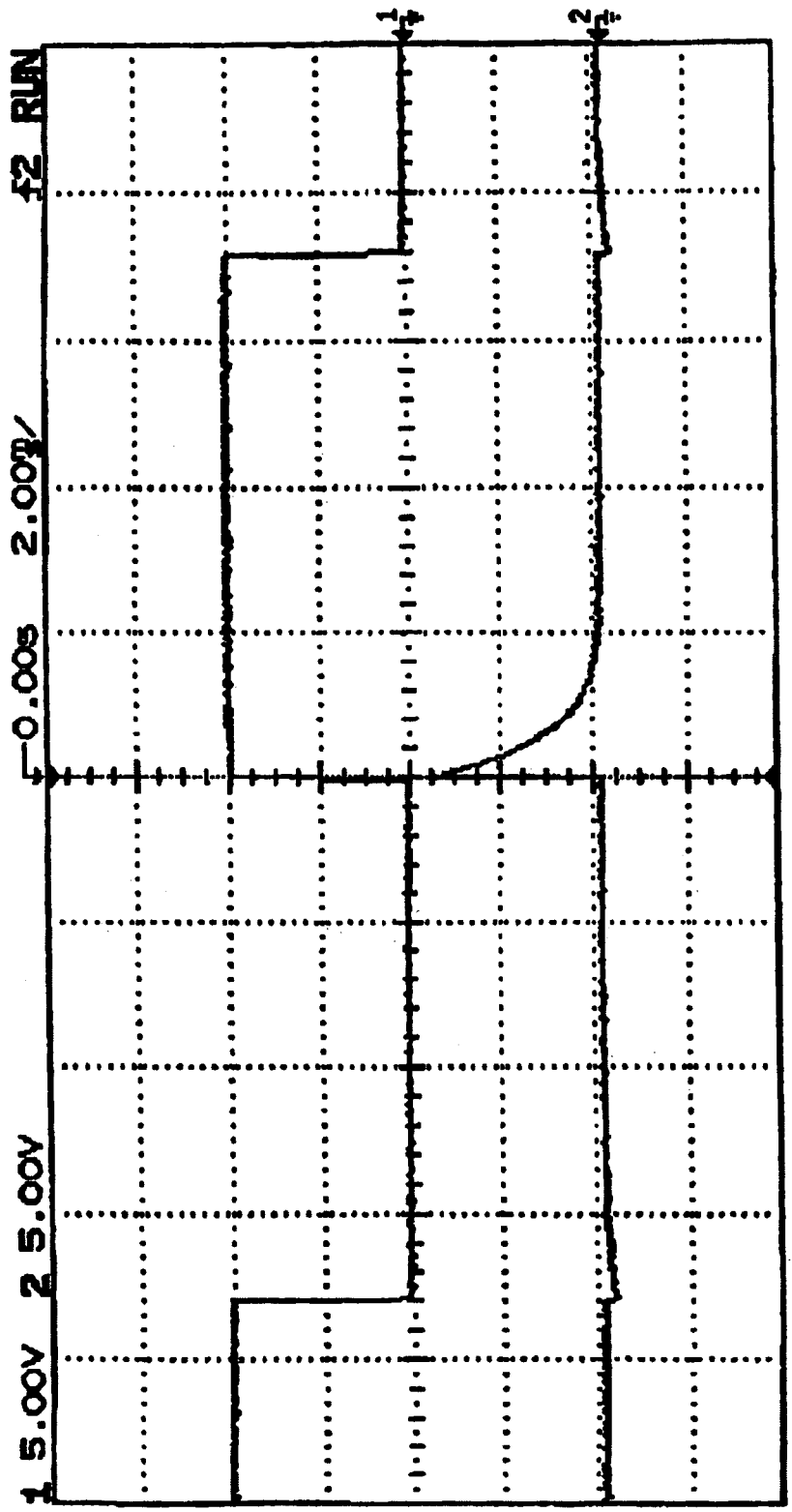
FIG. 8 shows the transient response of the latch circuit shown in FIG. 7.

FIG. 8 shows the transient response of the latch circuit 82' shown in FIG. 7. Signal 91 shows a square wave input (5 volts peak) produced by a signal generator. Signal 93 shows the transient response provided by capacitor 85 and resistor 87 off of reset input R.

Figure 9:
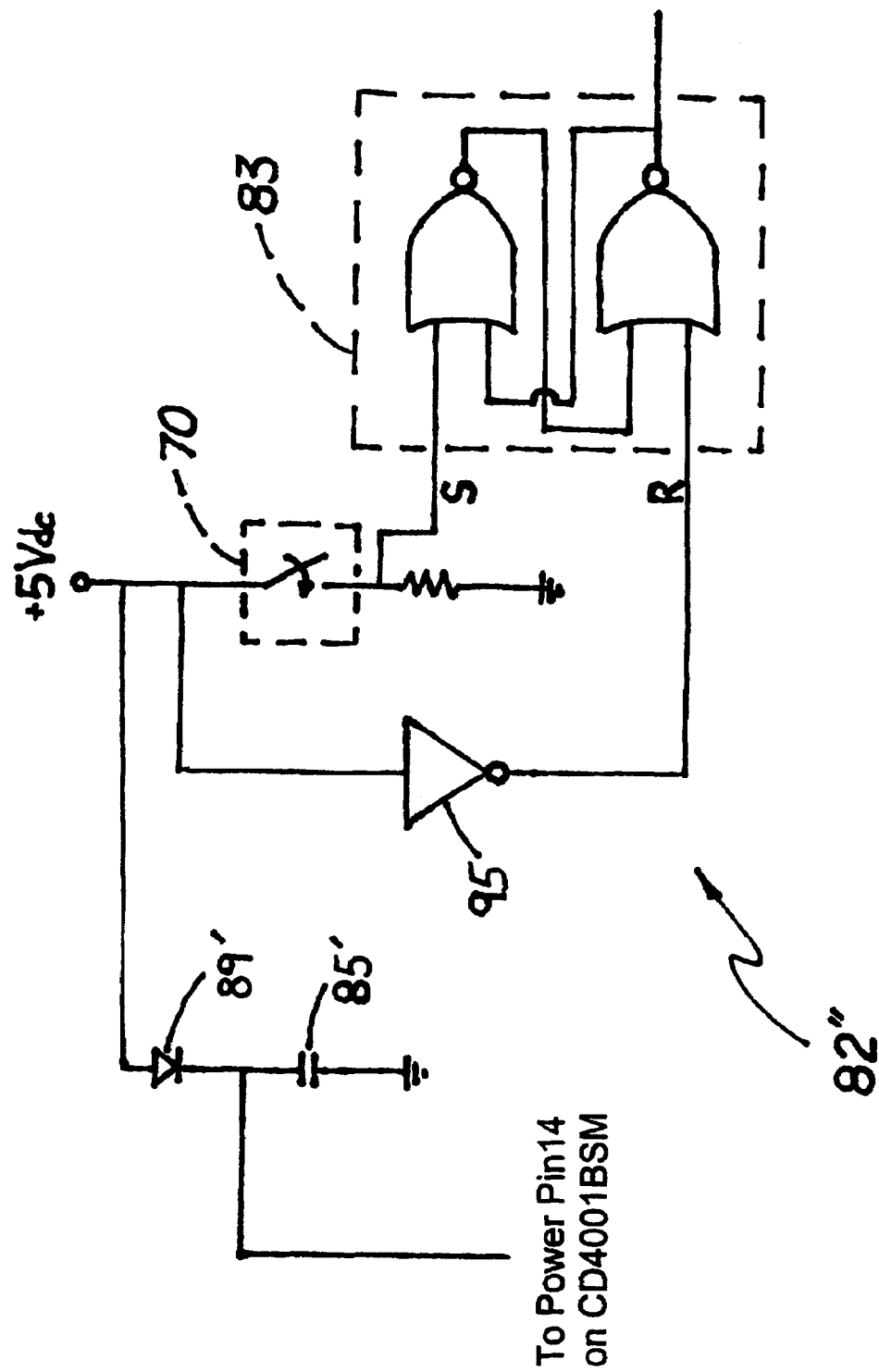
FIG. 9 shows a third preferred embodiment of a latch circuit for the printed circuit board illustrated in FIG. 4.

FIG. 9 shows a third preferred embodiment of a latch circuit 82" including switch 70 and latch 83. An inverter 95 is placed in the line from the voltage supply to reset input R of the latch 83. Capacitor 85' and diode 89' allow latch 83 to remain powered even if power is pulled from the latch circuit 82" for a very short time. Thus, there is no longer a dependence on determining the previous state of output Q at power-up. Further, it is possible to eliminate a forbidden operating state which could occur if switch 70 closes (putting set input S to logic 1) simultaneously with a transient spike putting reset input R to logic 1. In the forbidden operating state, latch 83 is not stable and could assume either logic 0 or logic 1.

Figure 10:
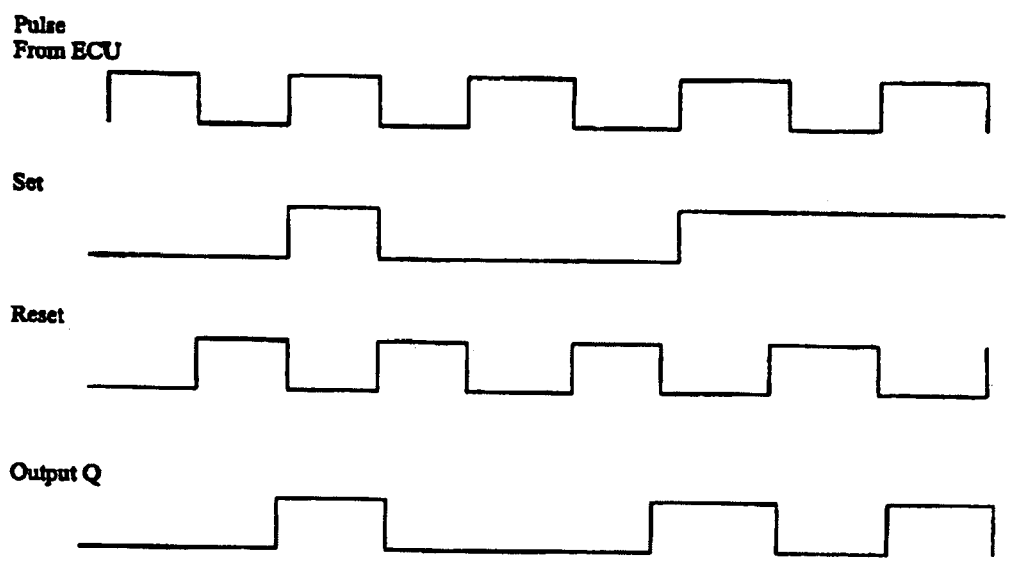
FIG. 10 shows a timing diagram for normal operation of the latch circuit shown in FIG. 9.

FIG. 10 shows a timing diagram for normal operation of latch circuit 82" shown in FIG. 9.

There is a very slight possibility (less than 0.0001%) that latch circuit 82" shown in FIG. 9 could operate in an abnormal manner. If switch 70 opens at the exact time reset input R goes to logic 0, or when switch 70 closes a the exact time reset input R goes to logic 1, latch circuit 82" may not provide an accurate output Q. Even if latch circuit 82" begins to operate abnormally, there is a 50% chance that output $f_a$ of NOR gate 83a will select the correct logic level and that latch circuit 82" will provide an accurate output Q.

Even if output $f_a$ of NOR gate 83a does not select the correct logic level, latch circuit 82" will eventually self correct itself. In particular, because latch 83 is continually powered, the logic level at output Q will eventually change to a known state (e.g., set input S at logic 1 and reset input R at logic 0, or set input S at logic 0 and reset input R at logic 1). Since reset input R changes every 10 milliseconds, abnormal operation will not last for longer than 40 milliseconds.

Figure 11:
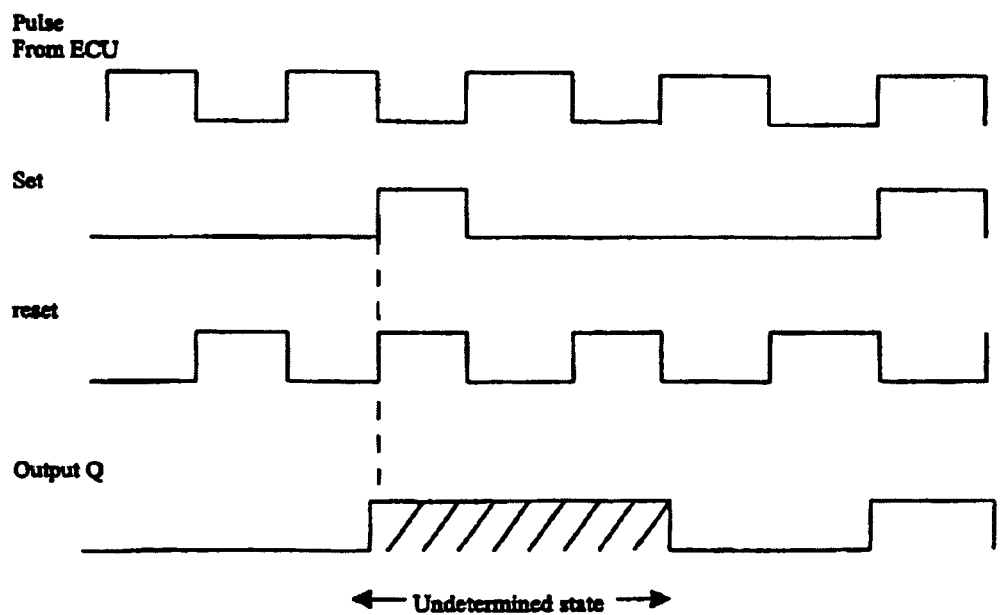
FIG. 11 shows a timing diagram for abnormal operation of the latch circuit shown in FIG. 9.

Referring now to FIG. 11, there is shown a timing diagram for abnormal operation of latch circuit 82" shown in FIG. 9. The dotted line shows the exact simultaneous occurrence of set input S going to logic 1 and reset input R going to logic 1. The output Q is thus undetermined because latch circuit 82" is abnormally operating in a forbidden state. At some time later, the logic levels at inputs S and R will become known and real time status of switch 70 will again be properly determined.

According to the second preferred control circuit feature on the printed circuit board 80, a delay provides the fuel system 10 with an opportunity to reach a thermal steady state before the printed circuit board 80 evaluates a switch actuating condition, e.g., signaling 22, such that inappropriate actuations of the switch 70 may be disregarded by the printed circuit board 80, thereby providing more accurate indications of the switch actuating condition, e.g., signaling 22.

A delay provides a number of advantages, including allowing the printed circuit board 80 to disregard inappropriate actuations of the switch 70 that may occur as a result of thermal instability in the fuel system immediately following engine shutdown. In combination with a latch, it is possible to eliminate the need for the electronic control unit 76 to be active when the engine is shut down, thereby conserving battery power. It is desirable to limit average current consumption by the printed circuit board 80 to less than 100 microamperes, since the fuel vapor pressure management apparatus 20 operates when the engine is shut down.

Figure 12:
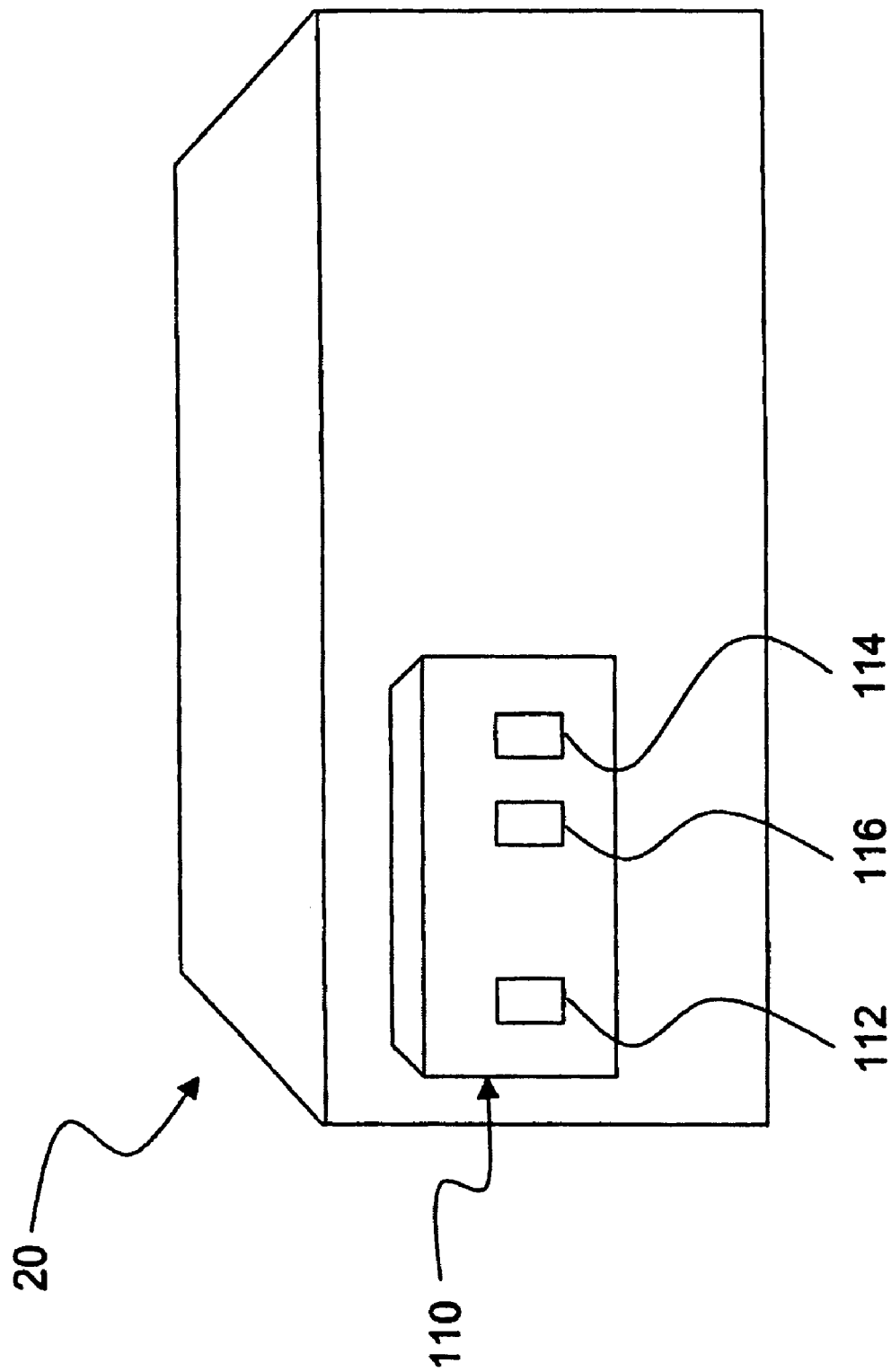
FIG. 12 shows a preferred embodiment of an electrical connector to the fuel vapor pressure management apparatus illustrated in FIG. 1.

FIG. 12 shows a preferred embodiment of an electrical connector 110 to the fuel vapor pressure management apparatus 20. The electrical connector 110 provides three conductors: a ground conductor 112, a power conductor 114, and an output conductor 116. Generally, the ground conductor 112 is electrically coupled with the vehicle ground system, the power conductor 114 is electrically coupled with the vehicle power supply, and the output conductor 116 is electrically coupled with the electronic control unit 76 for indicating the signaling 22.

With only three conductors 112-116 in the electrical connector 110, the power conductor 114 is preferably used to signal engine shutdown to the fuel vapor pressure management apparatus 20. An engine shutdown signal may be conveyed via the power conductor 114 using pulse width modulation (PWM) that is varied depending on whether the engine is shut down or not. However, using PWM will require a microprocessor, which is believed to adversely affect the dimensional packaging and cost, and may not be suitable for typical automotive voltage ranges (e.g., 0-15 volts).

Preferably, the engine shutdown signal is conveyed to the fuel vapor pressure management apparatus 20 by interrupting the voltage supplied via the power conductor 114 for a variable time depending on whether the engine is shut down or not. Preferably, the variance of time that voltage is "pulled" to the circuit is achieved with an RC time constant. For example, if power is "pulled" to the fuel vapor pressure management apparatus 20 when the engine is shut down for 100 milliseconds, the voltage held by the capacitor would be less than if the power is "pulled" for 10 milliseconds. Based on this information, the fuel vapor pressure management apparatus 20 can determine whether or not engine shutdown has occurred without adding a fourth conductor to the electrical connector 110.

According to a preferred embodiment, a combination of digital and analog circuit components are used on the printed circuit board 80. Of course, other embodiments may be made entirely of analog circuitry components, entirely of digital circuitry components, with microprocessor controlled circuitry, or some combinations of these circuit architectures. In general, analog circuitry components are believed to provide good dimensional packaging size and low cost, but are believe to suffer from poor current consumption and are not always suitable for typical automotive voltage ranges (e.g., 0-15 volts). Digital circuitry components are believed to provide good dimensional packaging size, low cost, and are suitable for typical automotive voltage ranges, but are believe to also suffer from poor current consumption. Microprocessor control circuitry is believed to provide good current consumption (e.g., in a so-called "sleep mode"), but is believed to suffer from poor dimensional packaging size, high cost, and is not always suitable for typical automotive voltage ranges.

Figure 13:
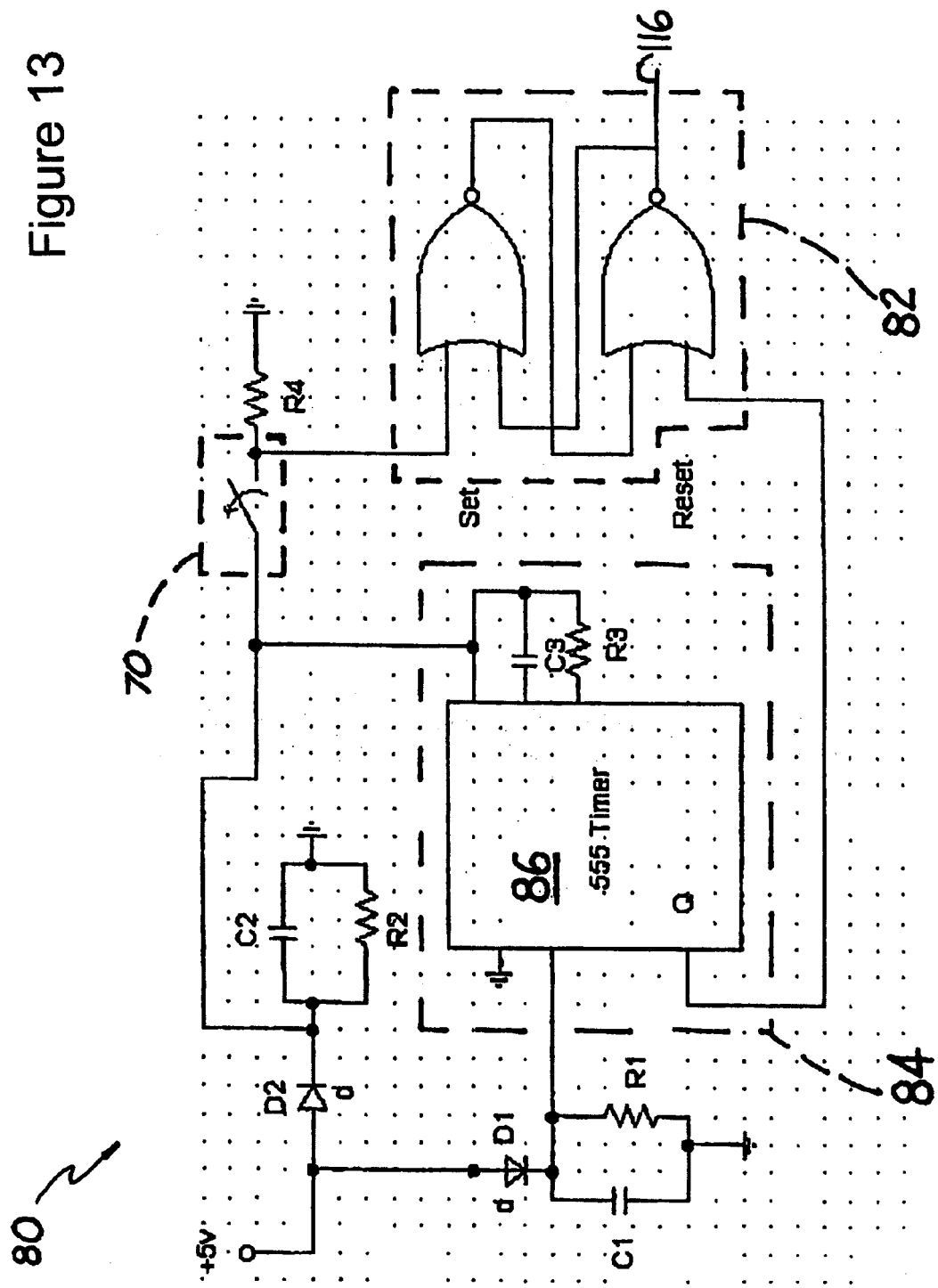
FIG. 13 shows a first preferred embodiment of a time delay circuit on the printed circuit board illustrated in FIG. 4.

FIG. 13 schematically shows a first preferred embodiment for the printed circuit board 80, including switch 70, the latch circuit 82, and a time delay circuit 84. The latch circuit 82 may alternatively be one of latch circuits 82' and 82" described above. The time delay circuit 84 includes a 555 timer integrated circuit chip 86 that is available either as a complementary metal-oxide semiconductor (CMOS) digital component or as a transistor-to-transistor logic (TTL) digital component. The 555 timer chip 86 keeps a capacitor C3 discharged through a resistor R3 to ground. When the 555 timer chip 86 is triggered, the capacitor C3 then charges through the resistor R3 by a time $t_w = 1.1 R_3 C_3$. Preferably, a delay of approximately five minutes is achieved with the time delay circuit 84 before sending an output signal Q to the Reset input to the latch circuit 82.

The circuit shown in FIG. 13 relies on the fact that there would be two different pulses sent to the circuit from the electronic control unit 76 upon occurrence of engine startup. If the engine were then to be shut down, then power to the fuel vapor pressure management apparatus 20 via the power conductor 114 would be "pulled" for a preset time, e.g., 100 milliseconds. This power interruption period is long enough for the 555 timer chip 86 to be triggered and for delay timing to begin. The beginning of the delay timing feeds a logic 0 to the Reset input of the latch circuit 82 until expiration of the delay period, approximately five minutes. During the time that power to the circuit shown in FIG. 13 is "pulled," the chips for the latch circuit 82 and the time delay circuit 84 are powered by a capacitor C2. The capacitor C2 has a larger capacitance than the capacitor C1 so as to ensure the chips for the latch circuit 82 and the time delay circuit 84 are powered during engine startup. Diodes D1 and D2 ensure against discharge back through the power supply (indicated in FIG. 13 by "+5v") when the capacitors C1,C2 are discharging. If the 555 timer chip 86 uses CMOS architecture, the Resistors R1 and R2 may be eliminated in view of the large input resistance for the RC time constant.

In operation, the circuit shown in FIG. 13 would reset the latch circuit 82 for the delay specified by the resistor R3 and the capacitor C3 upon engine shutdown. However, if engine startup occurs during the delay, the latch circuit 82 may not properly reset. Further, the current consumption of the 555 timer chip 86—rated at 200-400 microamperes depending on the operating temperature—exceeds the target of not more than 100 microamperes total current consumption for the entire printed circuit board 80.

Figure 14:
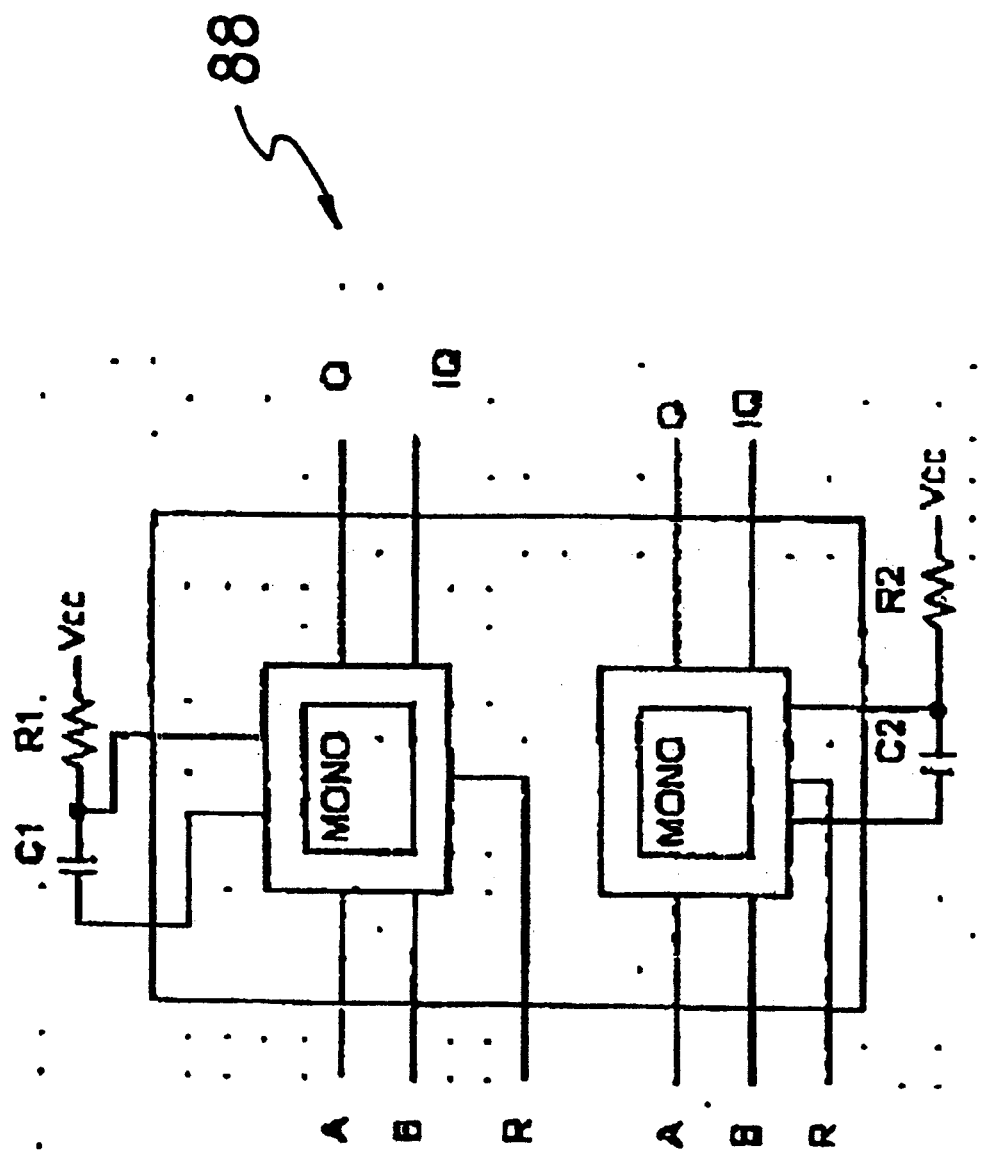
FIG. 14 schematically shows an alternative timer device.

FIG. 14 schematically shows an alternative to the 555 timer chip 86. A monostable multivibrator integrated circuit chip 88, which also uses CMOS architecture, is triggered by an external pulse on either the rising or the falling edge of the pulse. Similar to the 555 timer chip 86 in FIG. 13, the monostable multivibrator chip 88 provides an output pulse after a time period $t_w$ that is determined by an external resistor $R_x$ and capacitor $C_x$. Specifically, $t_w=0.7R_xC_x$. The monostable multivibrator chip 88 provides satisfactory current consumption throughout the typical automotive operating temperature range (e.g., −40° to +100° Celsius), and is inexpensive to obtain. However, the monostable multivibrator chip 88 is believed to be typically used for delays in the millisecond range, and the monostable multivibrator chip 88 may be unpredictable for delays in the range of five minutes.

Figure 15:
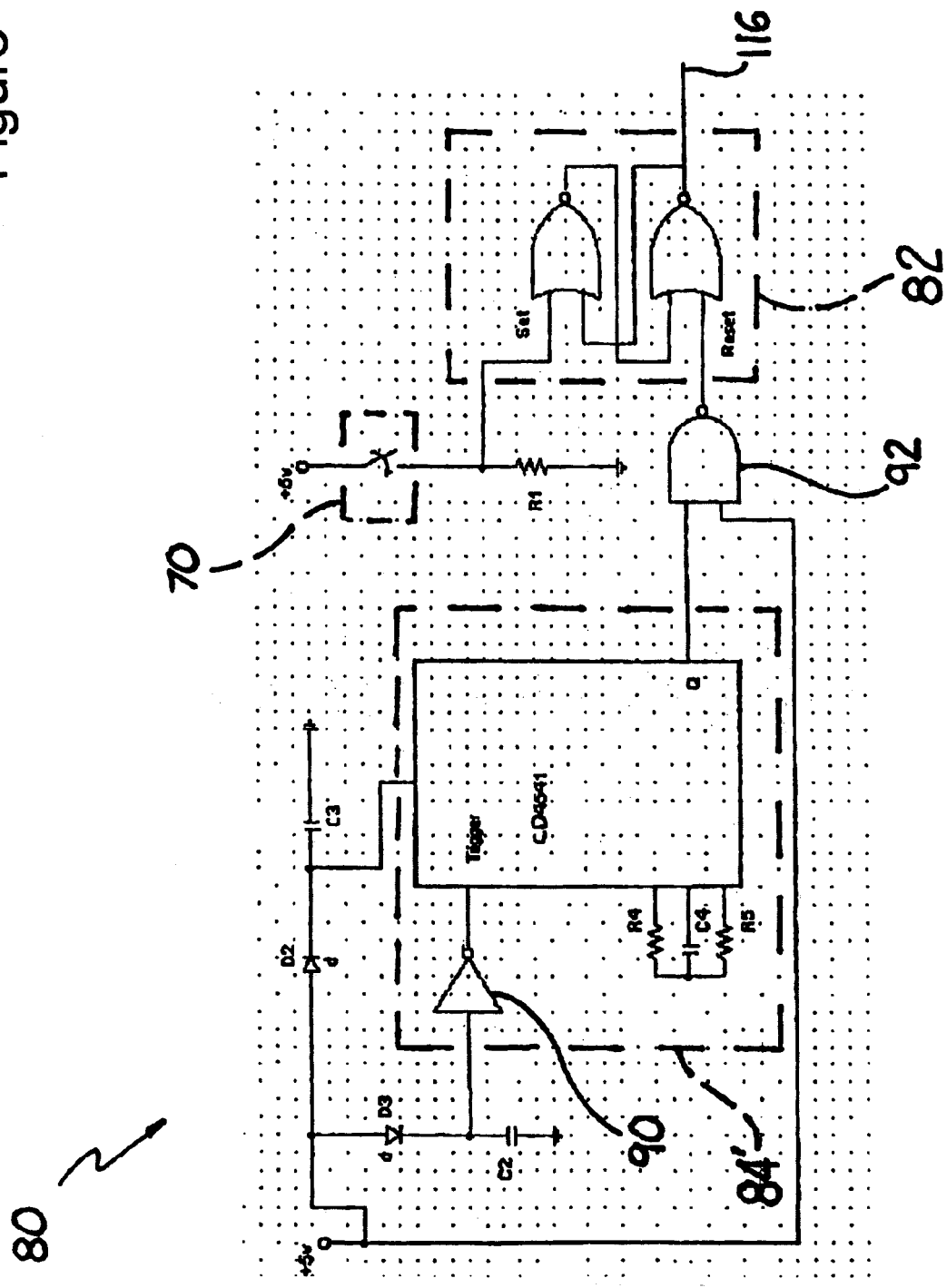
FIG. 15 shows a second preferred embodiment of a time delay circuit on the printed circuit board illustrated in FIG. 4

FIG. 15 schematically shows a second preferred embodiment for the printed circuit board 80, including switch 70, the latch circuit 82, and a time delay circuit 84'. The latch circuit 82 may alternatively be one of latch circuits 82' and 82" described above. The time delay circuit 84' also uses a digital timer like that of the 555 timer chip 86 shown in FIG. 13. In particular, the time delay circuit 84' includes a CMOS digital timer with an internal oscillator that depends on an external resistor and capacitor to generate the clocking frequency. An example of such a timer is made Model CD4541 made by Fairchild Semiconductor. The CD4541 is triggered by the rising edge of a pulse on the trigger input, thus an inverter 90 is used to achieve a positive pulse during engine startup. The CD4541 is triggered only when the engine is shut down because the voltage on the capacitor C2 will keep the CD4541 powered during the ~100 millisecond triggering pulse to the CD4541.

A resistor R5 and a capacitor C4 generate the clocking frequency of the CD4541. If the resistor R5=1.8 MΩ and the capacitor C4=9 nF, the clocking frequency is 193 Hz. The CD4541 is a 16-stage timer, thus, after triggering; the timer will count $2^{16}$ pulses before the output will change state. At the clocking frequency of 193 Hz, the CD4541 accurately provides a delay of 290 seconds (four minutes, 50 seconds).

A NAND gate 92 implements the functionality required to reset the latch circuit 82 when engine startup occurs.

In operation, the circuit shown in FIG. 15 will reset the latch circuit 82 when the timer CD4541 triggered at engine shutdown, or when any engine startup occurs. Current consumption is approximately 20 microamperes; well within the desired target range.

Figure 16:
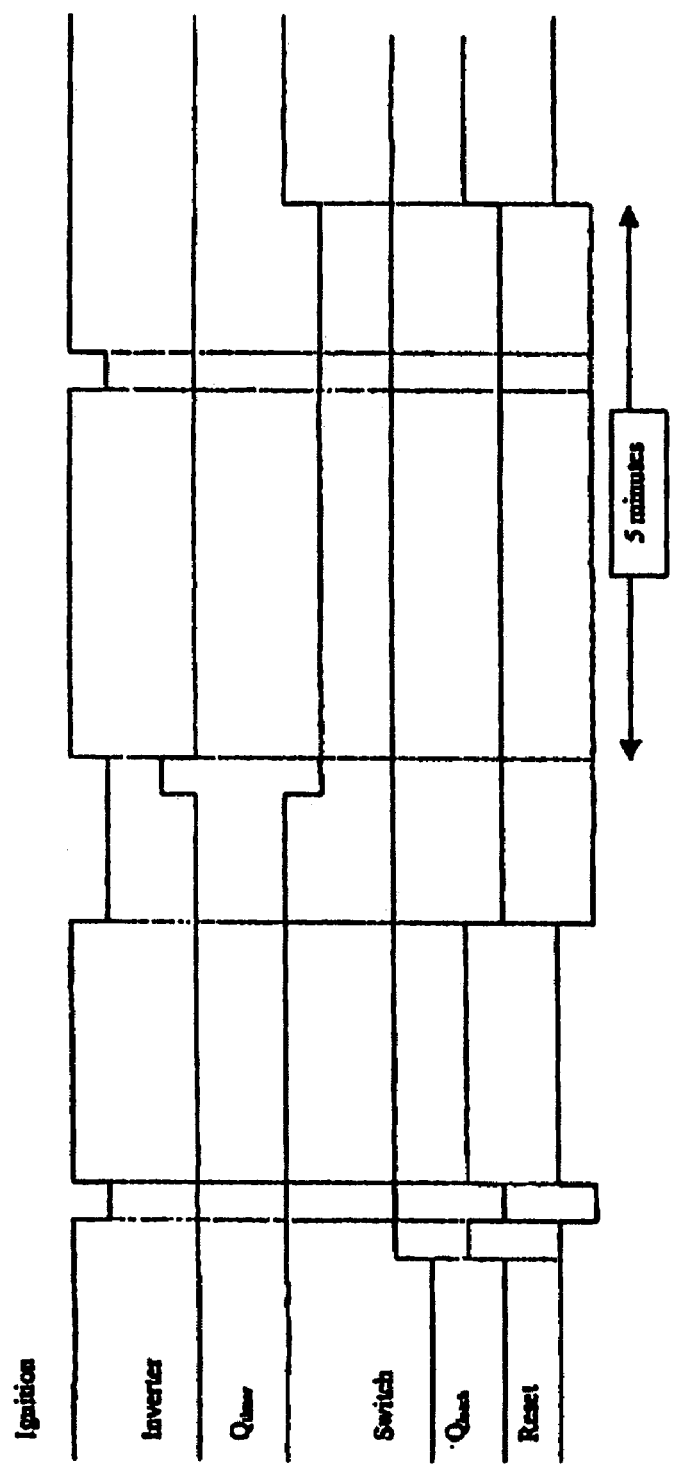
FIG. 16 shows a delay-timing diagram for the circuit shown in FIG. 15.

FIG. 16 shows a delay timing diagram for the circuit shown in FIG. 15. It is noted that if the engine is started up during the delay period, the output of the latch circuit 82 may not accurately monitor the status of the switch 70 in "real-time."

Figure 17:
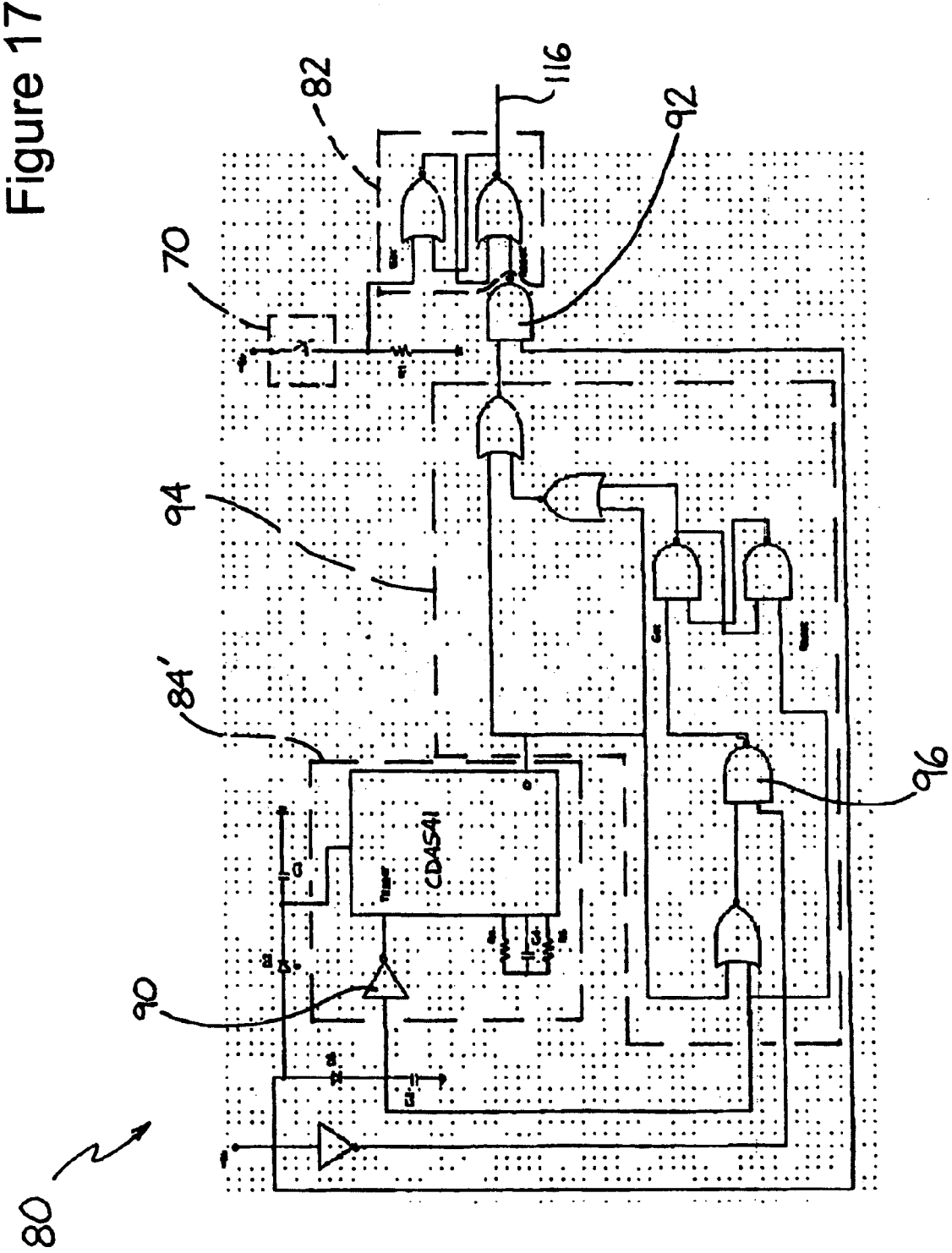
FIG. 17 shows a third preferred embodiment of a time delay circuit on the printed circuit board illustrated in FIG. 4.

FIG. 17 schematically shows a third preferred embodiment for the printed circuit board 80, including the switch 70, the latch circuit 82, the time delay circuit 84', and an ignition occurrence latch circuit 94. The latch circuit 82 may alternatively be one of latch circuits 82' and 82" described above. The additional ignition occurrence latch circuit 94 ensures that the output of the latch circuit 82 will accurately monitor the status of the switch 70 in "real-time," regardless of the occurrence of engine startup during the delay period. The additional ignition occurrence latch circuit 94 provides a set/reset structure, including a NAND gate 96, which will be set when the CD4541 is triggered and there is engine startup. Upon such an occurrence, the ignition occurrence latch circuit 94 will disable the pulse output from the CD4541 to the Reset input of the latch circuit 82. During the delay provided by the CD4541, if there is not engine startup, the ignition occurrence latch circuit 94 including the NAND 96 will not be set and the CD4541 will continue the delay for its duration, preferably approximately five minutes). If the ignition occurrence latch circuit 94 including the NAND 96 is set, it will be reset upon the next engine shutdown.

Figure 18:
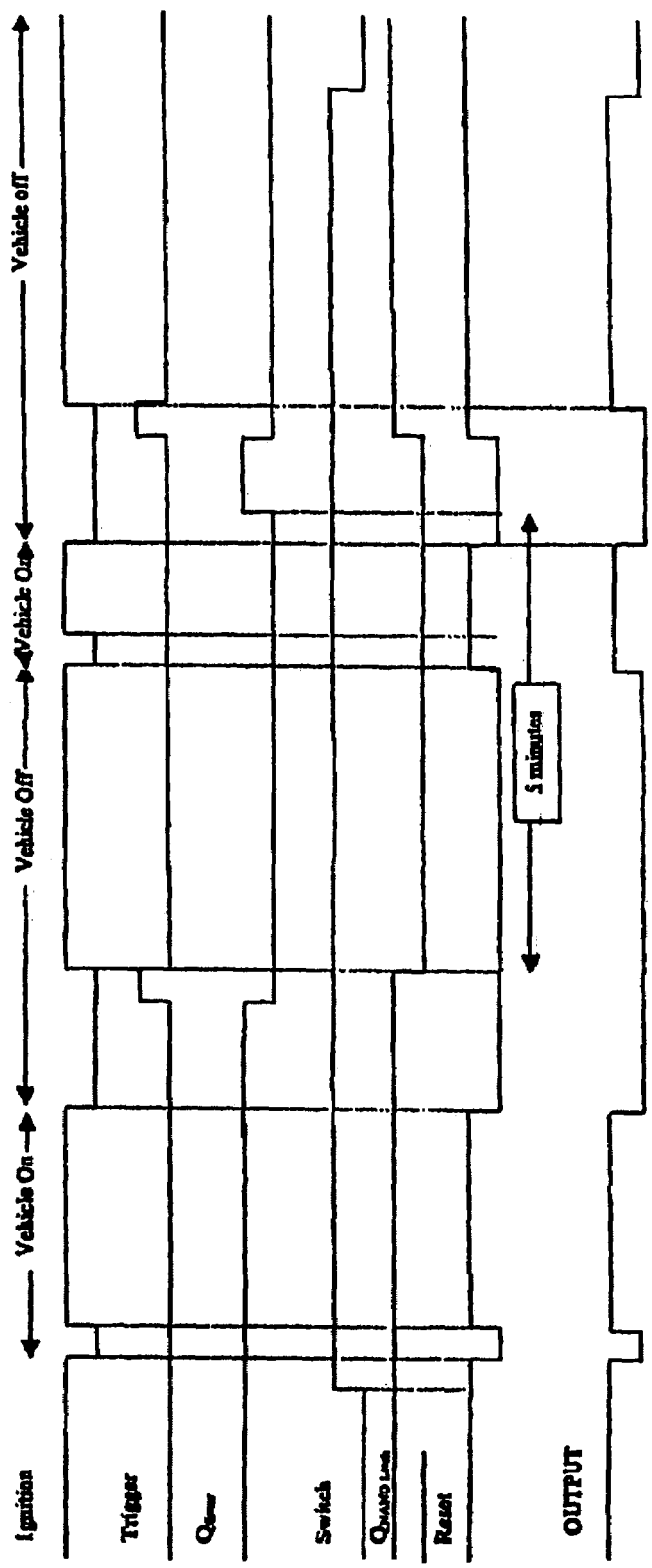
FIG. 18 shows a timing diagram for the circuit shown in FIG. 17.

FIG. 18 shows a timing diagram for the circuit shown in FIG. 17. In operation, the circuit shown in FIG. 17 will reset in two instances: 1) when engine startup occurs, or 2) when engine shutdown occurs. Resetting the latch circuit 82 will be delayed approximately five minutes after engine shutdown unless engine startup occurs during this delay, in which case the resetting of the latch circuit 82 by the timer CD4541 will be terminated and the latch circuit 82 will be reset by the engine startup per se.

The current consumption of the circuit shown in FIG. 17 is only 6 microamperes with a five volt supply voltage, and only 47 microamperes with a 10 volt supply voltage. With a 15 volt supply, current consumption is approximately 125 microamperes, therefore it is preferable for the electronic control unit 76 to provide a five volt supply voltage.

The circuit shown in FIG. 17 provides a number of advantages including allowing the fuel system 10 to thermally stabilize following engine shutdown before commencing leak detection, and allowing the electronic control unit 76 to perform a "real-time" analysis of the actuation of switch 70 during engine on conditions, without regard to how or when the engine was previously started up or shut down.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel vapor pressure management apparatus for an internal combustion engine, the apparatus comprising:
a housing defining an interior chamber;
a pressure operable device being movable along an axis between first and second configurations, the first configuration of the pressure operable device separating the interior chamber into first and second portions such that fluid flow between the first and second portions is prevented, and the second configuration of the pressure operable device permitting fluid flow between the first and second portions; and a printed circuit board supported by the housing in the interior chamber, the printed circuit board including:
  a delay commencing upon internal combustion engine shutdown and concluding after a preset period; and
  a sensor indicating movement of the pressure operable device in the first configuration after the conclusion of the preset period.

2. The apparatus according to claim 1, wherein the preset period is approximately five minutes.

3. The apparatus according to claim 1, wherein the delay comprises a digital timer including an internal oscillator.

4. The fuel vapor pressure management apparatus according to claim 1, wherein the first configuration of the pressure operable device includes the first condition and a second condition, the first condition of the first configuration of the pressure operable device indicates a predetermined level of vacuum in the second portion relative to the first portion, and the second condition of the first configuration of the pressure operable device indicates failure to achieve the predetermined level of vacuum in the second portion relative to the first portion.

5. The fuel vapor pressure management apparatus according to claim 4, wherein the predetermined level of vacuum is one inch of water.

6. The fuel vapor pressure management apparatus according to claim 1, wherein the second configuration of the pressure operable device includes first and second arrangements, the first arrangement of the second configuration permits fluid flow from the first portion of the interior chamber to the second portion of the interior chamber, and the second arrangement of the second configuration permits fluid flow from the second portion of the interior chamber to the first portion of the interior chamber.

7. The fuel vapor pressure management apparatus according to claim 6, wherein the sensor indicates movement of the pressure operable device in the first arrangement of the second configuration of the pressure operable device.

8. The fuel vapor pressure management apparatus according to claim 7, wherein the sensor does not indicate movement of the pressure operable device in the second arrangement of the second configuration of the pressure operable device.

9. The fuel vapor pressure management apparatus according to claim 1, wherein an average current consumption of the printed circuit board is less than 100 microamperes.

10. The fuel vapor pressure management apparatus according to claim 1, wherein the sensor comprises at least one of a contact switch and a proximity sensor.

11. The fuel vapor pressure management apparatus according to claim 10, wherein the contact switch is adapted to be contiguously engaged by the pressure operable device.

12. The apparatus according to claim 1, wherein the printed circuit board comprises:
  a latch being set by the sensor indicating movement of the pressure operable device after the conclusion of the preset period, the latch indicating a first condition of the pressure operable device in response to being set by the sensor.

13. The apparatus according to claim 12, wherein the printed circuit board comprises:
  an ignition occurrence latch being set upon internal combustion engine startup during the preset period, the ignition occurrence latch resetting the latch indicating the first condition of the pressure operable device in response to being set by the sensor.

14. The fuel vapor pressure management apparatus according to claim 12, wherein the printed circuit board comprises at least one communication port, and the first condition indicated by the latch is communicated via the at least one communication port.

15. The fuel vapor pressure management apparatus according to claim 14, wherein the at least one communication port communicates a reset signal to the latch.

16. The fuel vapor pressure management apparatus according to claim 15, further comprising:
  a computer receiving via the communication port the indication of the first condition, and the computer sending via the communication port the reset signal.

17. The fuel vapor pressure management apparatus according to claim 12, wherein the latch holds the indication of the first condition of the pressure operable device until a reset signal is delivered to the latch.

18. The fuel vapor pressure management apparatus according to claim 12, wherein the latch comprises a digital complementary metal-oxide semiconductor.

19. The fuel vapor pressure management apparatus according to claim 18, wherein the latch comprises a set/reset latch.

* * * * *